US012320418B2

(12) United States Patent
Ertas et al.

(10) Patent No.: US 12,320,418 B2
(45) Date of Patent: Jun. 3, 2025

(54) GEARBOX ASSEMBLY WITH LUBRICANT EXTRACTION VOLUME RATIO

(71) Applicants: General Electric Company, Evendale, OH (US); GE Avio S.r.l., Rivalta di Torino (IT)

(72) Inventors: Bugra H. Ertas, Niskayuna, NY (US); Xiaohua Zhang, Glenville, NY (US); Miriam Manzoni, Rivalta di Torino (IT); Flavia Turi, Bari (IT); Andrea Piazza, Turin (IT); Arthur W. Sibbach, Boxford, MA (US); Brandon W. Miller, Middletown, OH (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/972,185

(22) Filed: Dec. 6, 2024

(65) Prior Publication Data

US 2025/0102058 A1 Mar. 27, 2025

Related U.S. Application Data

(63) Continuation-in-part of application No. 18/068,017, filed on Dec. 19, 2022.

(30) Foreign Application Priority Data

Jun. 22, 2022 (IT) ........................ 102022000013213

(51) Int. Cl.

*F02C 7/06* (2006.01)
*F01D 15/12* (2006.01)

(Continued)

(52) U.S. Cl.

CPC ........... *F16H 57/045* (2013.01); *F01D 15/12* (2013.01); *F01D 25/20* (2013.01);

(Continued)

(58) Field of Classification Search

CPC ............... F16H 57/045; F16H 57/0408; F16H 57/0427; F16H 57/0421

See application file for complete search history.

(56) References Cited

U.S. PATENT DOCUMENTS 2,860,648 A * 11/1958 Harrison ................ B64D 37/22 244/135 R
3,529,698 A * 9/1970 Nelson ................ F16H 57/0447 184/6.12

(Continued)

FOREIGN PATENT DOCUMENTS

DE 2904960 A1 8/1980
EP 2148114 A1 1/2010

(Continued)

*Primary Examiner* — Michael A Riegelman
(74) *Attorney, Agent, or Firm* — Venable LLP; Peter T. Hrubiec; Michele V. Frank

(57) ABSTRACT

A gearbox assembly includes a gearbox having a gear assembly and a gutter for collecting a gearbox lubricant scavenge flow from the gearbox. The gutter is characterized by a lubricant extraction volume ratio between 0.01 and 0.3, inclusive of the endpoints. The lubricant extraction volume ratio is defined by $$\frac{V_G}{V_{GB}}.V_G$$

is a gutter volume of the gutter and $V_{GB}$ is a gearbox volume. A gas turbine engine includes the gearbox assembly and a lubrication system. The lubrication system includes a sump that is a primary reservoir having a first lubricant level and (Continued)

100 106 106 103 114 101 104 200 140 122 150 102 206 204 Lubricant Pump 211 216b 202 Tank 210 209 115 R 208 214 201 216 216a 218 Sump Pump C X 212 a secondary reservoir in the gearbox assembly. The secondary reservoir has a second lubricant level. The lubrication system fills the secondary reservoir with a lubricant between the first lubricant level and the second lubricant level. The gear assembly collects the lubricant in the secondary reservoir to supply the lubricant to the gear assembly.

20 Claims, 14 Drawing Sheets

(51) Int. Cl.
*F01D 25/20* (2006.01)
*F16H 57/04* (2010.01)

(52) U.S. Cl.
CPC ..... *F16H 57/0408* (2013.01); *F16H 57/0421* (2013.01); *F16H 57/0427* (2013.01); *F16H 57/0435* (2013.01); *F16H 57/0436* (2013.01); *F05D 2260/40311* (2013.01); *F05D 2260/98* (2013.01); *F16H 57/0486* (2013.01)

(56) References Cited

U.S. PATENT DOCUMENTS 4,170,873 A * 10/1979 Milo ....................... F01D 25/20 60/39.08
4,245,465 A * 1/1981 Milo ....................... F01D 25/18 60/39.08
4,845,483 A * 7/1989 Negishi .................. G06K 15/12 347/225
5,141,179 A * 8/1992 Gautier .................. B64D 37/22 137/574
5,845,483 A * 12/1998 Petrowicz ............... F02C 7/262 60/788
6,793,042 B2 * 9/2004 Brouillet ................. F01D 25/18 184/6.11
7,213,682 B2 * 5/2007 Gibson ............... F16H 57/0421 184/6.12
7,662,059 B2 * 2/2010 McCune ................. F01D 25/20 184/6.12
7,815,536 B2 * 10/2010 Jansen .................... F03D 80/70 290/55
7,849,668 B2 * 12/2010 Sheridan ................. F01D 25/20 384/473
7,883,438 B2 2/2011 McCune
8,007,253 B2 * 8/2011 Dooley ................. F04D 29/047 415/72
8,307,626 B2 * 11/2012 Sheridan ................. F01D 25/20 184/29
8,401,760 B2 * 3/2013 Payne ....................... F02C 7/06 701/30.9
8,602,165 B2 * 12/2013 Szolomayer .............. F02C 7/06 137/574
8,702,373 B1 * 4/2014 Valva .................. F16H 57/0495 416/174
8,740,549 B2 * 6/2014 Shashank .................. F02C 6/12 415/110
9,086,055 B2 * 7/2015 Subramaniam ......... F03D 80/70
9,404,420 B2 * 8/2016 Gallet ................. F16H 57/0456
9,790,804 B2 * 10/2017 Lepretre ................... F02C 7/06
9,903,227 B2 * 2/2018 Cigal ...................... F01D 25/18
10,060,289 B2 * 8/2018 Sheridan ............ B01D 19/0068
10,082,105 B2 * 9/2018 McCune ................ F16H 57/04
10,167,873 B2 * 1/2019 Sheridan ................... F02C 7/32
10,196,926 B2 * 2/2019 Ketchum ................ F01D 25/20
10,208,624 B2 * 2/2019 Duong .................... F02C 3/107
10,247,020 B2 * 4/2019 McCune ................. F01D 9/065
10,267,233 B2 * 4/2019 Mastro .................... F02C 3/107
10,287,915 B2 * 5/2019 McCune ................. F01D 25/18
10,316,855 B2 * 6/2019 Mastro .................. F04D 29/329
10,364,881 B2 * 7/2019 Pikovsky .............. F16H 57/043
10,371,007 B2 * 8/2019 Cigal ...................... F01D 25/20
10,513,949 B2 * 12/2019 Parnin ................. F16H 57/0442
10,526,913 B2 * 1/2020 Roberge .................... F02C 7/36
10,570,824 B2 * 2/2020 Schwarz ............. F16H 57/0482
10,577,974 B2 3/2020 Valva et al.
10,605,351 B2 * 3/2020 Sheridan ............. F16H 57/0479
10,634,053 B2 * 4/2020 Schwarz ............. F16H 57/0471
10,711,877 B2 * 7/2020 Fisher ................. F16H 57/0486
10,801,413 B2 * 10/2020 Roberge .................... F02C 6/14
10,851,689 B2 * 12/2020 Engel ................... F01M 11/065
11,060,417 B2 7/2021 McCune
11,066,945 B2 * 7/2021 McCune ................. F01D 25/18
11,073,041 B2 * 7/2021 Uhkoetter ................ F01M 1/02
11,085,521 B2 * 8/2021 Edwards ................... F16N 7/16
11,092,037 B2 8/2021 Valva et al.
11,203,974 B2 * 12/2021 Sheridan ................... F02K 3/06
11,236,637 B2 * 2/2022 Parnin .................. F01M 11/067
11,268,453 B1 * 3/2022 Desjardins .......... F16H 57/0479
11,313,454 B2 * 4/2022 Davies ...................... F02C 7/36
11,339,725 B2 * 5/2022 Simon ....................... F16H 1/28
11,719,127 B2 * 8/2023 Davis ...................... F01D 25/32 184/6.11
2011/0168494 A1 * 7/2011 Subramaniam ......... F03D 80/70 184/6.12
2012/0192974 A1 * 8/2012 Szolomayer ........... B01D 45/16 137/571
2013/0319006 A1 * 12/2013 Parnin ..................... F02C 3/107 184/6.12
2015/0089918 A1 * 4/2015 Valva ........................ F02C 7/36 415/111
2015/0267618 A1 * 9/2015 Schwarz ................... F16H 1/36 29/889
2016/0032773 A1 * 2/2016 James ..................... F01D 25/16 416/170 R
2017/0051823 A1 * 2/2017 Pikovsky ................ F01D 25/18
2017/0108110 A1 * 4/2017 Sheridan ................ F16N 31/00
2019/0113127 A1 * 4/2019 Gravina .................... F02C 7/06
2019/0170004 A1 * 6/2019 McCune ................ F01D 25/18
2019/0271236 A1 9/2019 McCune
2019/0323597 A1 * 10/2019 Sheridan ................. F01D 19/00
2019/0376416 A1 * 12/2019 Mastro ....................... F02C 7/36
2020/0165980 A1 * 5/2020 Di Giovanni ............. F02C 7/36
2020/0200042 A1 * 6/2020 Charrier .................. F01D 25/18
2021/0017910 A1 * 1/2021 Spruce ....................... F16H 1/06
2021/0148453 A1 * 5/2021 Pennacino .......... F16H 57/0427
2021/0222767 A1 * 7/2021 Jabido ................. F16H 57/0427
2021/0324762 A1 * 10/2021 Anglin .................. F01D 11/003
2022/0316584 A1 * 10/2022 Jacquemard .......... F16N 39/002
2022/0397040 A1 * 12/2022 Molesini ............. F16H 57/0427
2023/0021913 A1 * 1/2023 Levisse ................... F02C 3/067
2023/0313738 A1 * 10/2023 Zhang ....................... F02C 7/06 184/6.11
2023/0417185 A1 * 12/2023 Ertas ................... F16H 57/0486
2024/0426374 A1 * 12/2024 Miller ................... F16H 57/045

FOREIGN PATENT DOCUMENTS

EP 2980368 A1 2/2016
EP 2855859 B1 1/2019
EP 3557028 A1 10/2019
EP 3636884 A1 4/2020
EP 4067145 A1 10/2022
FR 3127024 A1 3/2023
FR 3127025 A1 3/2023
FR 3129436 A1 5/2023
FR 3129690 A1 6/2023
FR 3130747 A1 6/2023
FR 3130875 A1 6/2023
WO 2015147949 A2 10/2015

* cited by examiner

GEARBOX ASSEMBLY WITH LUBRICANT EXTRACTION VOLUME RATIO

CROSS REFERENCE TO RELATED APPLICATIONS

The present application is a continuation-in-part application of U.S. patent application Ser. No. 18/068,017, filed Dec. 19, 2022, which claims the benefit of Italian Patent Application No. 102022000013213, filed on Jun. 22, 2022, the entire contents of which are incorporated by reference in their entireties.

TECHNICAL FIELD

The present disclosure relates to a gearbox assembly for an engine, for example, a gas turbine engine for an aircraft.

BACKGROUND

Lubricant is used in a power gearbox to lubricate gears and rotating parts in the gearbox. Lubricant may be supplied to lubricate the mesh between the gears. As the gears of the gearbox assembly rotate during operation, the lubricant is expelled outwardly. The lubricant is captured by a gutter.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, or structurally similar elements.

FIG. 5A shows the gearbox assembly in a first rotational position.

FIG. 5B shows the gearbox assembly in a second rotational position.

FIG. 5C shows the gearbox assembly in a third rotational position.

FIG. 6 shows the gearbox assembly in the second rotational position.

DETAILED DESCRIPTION

Figure 1:
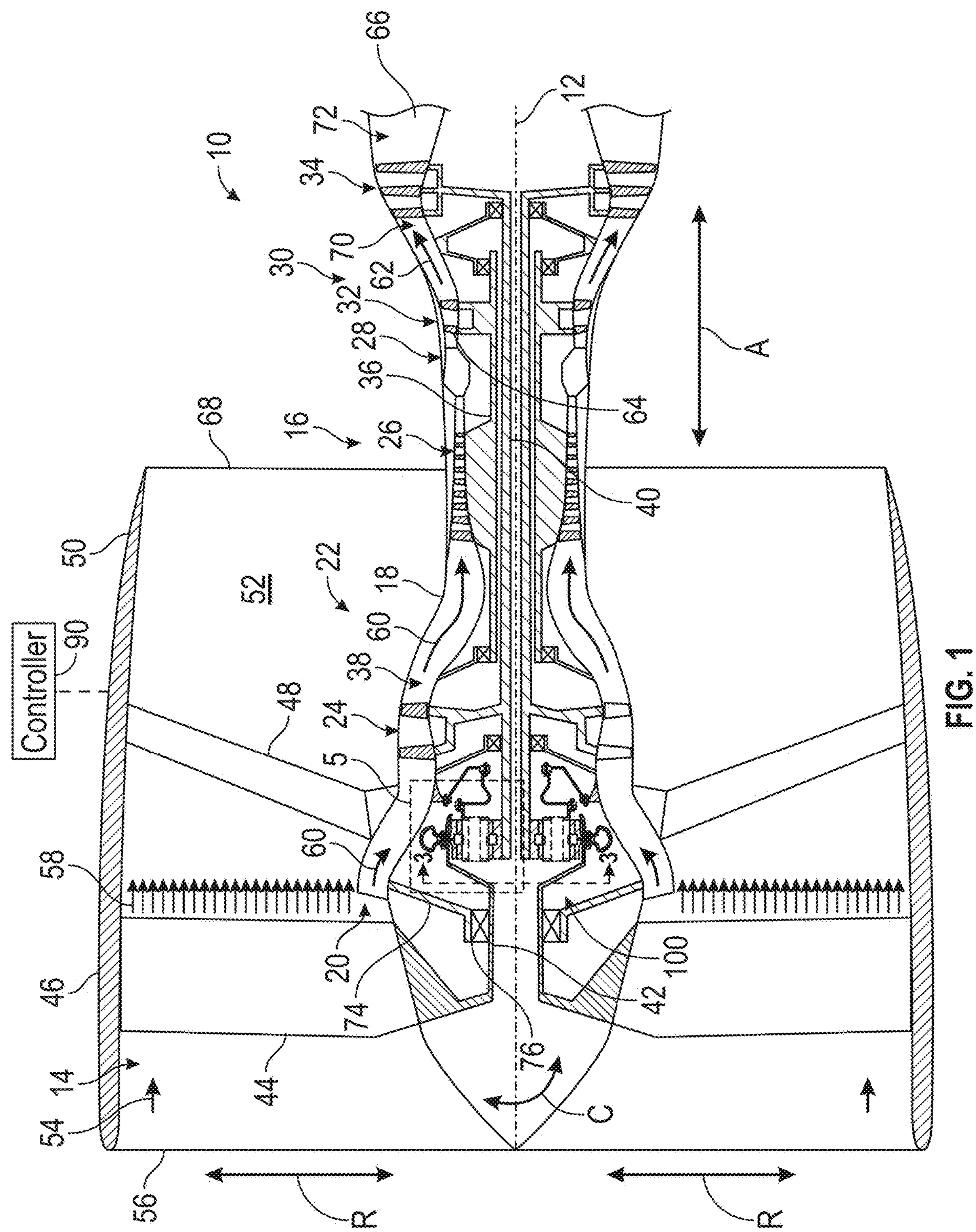
FIG. 1 illustrates a schematic, cross-sectional view of an engine, taken along a centerline axis of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, "windmill" or "windmilling" is a condition when the fan and the low-pressure shaft of the gas turbine engine continue to rotate at low speeds, while the high-pressure shaft rotates slowly or even stops. Windmilling can occur when the gas turbine engine is shutdown, but air still flows across the fan, such as during an in-flight engine shutdown or when the gas turbine engine is on the ground and the fan is rotating in the presence of wind when the gas turbine engine is shutdown. During a shutdown, e.g., while the aircraft is on the ground, the fan may also rotate in either direction depending upon the stationary position of the gas turbine engine relative to the ambient wind. Airflow entering the fan exhaust may exit the fan inlet in an opposite direction as a direction of operation and cause the fan to rotate in an opposite rotational direction compared to the intended operational rotational direction.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft.

In either configuration, it is desired to increase efficiency. There are several effects that can negatively impact a gearbox's efficiency. For example, gearboxes experience windage across rotating components (e.g., in the bearing, in rolling surfaces, in the gears), that is, shear and drag forces are generated across the gears, pins, and bearings of the gearboxes. In another example, the rotating components of the gearbox experience friction losses due to the relative rotation between components. The windage and friction losses reduce the efficiency of the gearbox. In addition to reducing efficiency, windage and friction losses contribute to heat generation in gearboxes. The relative rotating surfaces and force transmission between the gears also generates heat in the gearboxes.

When a gearbox operates at higher efficiency a greater percentage of the input power from the LP shaft is transferred to the fan shaft. To improve gearbox efficiency, lubrication is provided to the gearboxes to provide a protective film at the rolling contact surfaces, to lubricate the components, and to remove heat from the gearbox. Lubrication supplied to the gearbox, however, needs to be removed from the gearbox. Buildup of lubrication in the gearbox may reduce efficiency and may not remove the heat from the gearbox. Furthermore, allowing the lubrication in the gearbox to enter other components of the engine may negatively impact operation of the other components. One way to remove lubrication from the gearbox is to scavenge the lubrication through a gutter. The gutter collects lubricant expelled from the gearbox during operation. Gutters are often designed to circumscribe the ring gear, without taking into account the requirements of the engine or the gearbox. This results in gutters that are too large or too small. A gutter that is larger than required for the engine takes up valuable space in the engine, adding weight to the engine and decreasing overall engine efficiency. A gutter that is smaller than required for the engine may not properly scavenge the lubricant from the gearbox, allowing leakage from the gutter and reducing the ability of the lubricant to remove heat from the gearbox. The inventors, seeking ways to improve upon existing gutters in terms of their size/capacity for particular architectures, gearbox types and/or mission requirements, tested different gutter configurations to ascertain what factors play into an appropriate gutter sizing.

FIG. 1 illustrates a schematic, cross-sectional view of an engine 10. The engine 10 may be, for example, but not limited to, a turbine engine, such as a gas turbine engine. The engine 10 defines an axial direction A extending parallel to a longitudinal, engine centerline, also referred to as a longitudinal centerline axis 12, a radial direction R that is normal to the axial direction A, and a circumferential direction C about the longitudinal centerline axis 12 (shown in/out of the page in FIG. 1). The engine 10 includes a fan section 14 and a core engine, also referred to as a turbo-engine 16, downstream from the fan section 14.

The turbo-engine 16 includes a core engine casing, also referred to as an outer casing 18, that is substantially tubular and defines an annular inlet 20. The outer casing 18 encases, and the turbo-engine 16 includes, in serial flow relationship, a compressor section 22 including a low-pressure compressor 24, also referred to as a booster 24, followed downstream by a high-pressure compressor 26, a combustion section 28, a turbine section 30 including a high-pressure turbine 32 followed downstream by a low-pressure turbine 34, and a jet exhaust nozzle section 72 downstream of the low-pressure turbine 34. A high-pressure shaft 36 drivingly connects the high-pressure turbine 32 to the high-pressure compressor 26 to rotate the high-pressure turbine 32 and the high-pressure compressor 26 in unison. The compressor section 22, the combustion section 28, the turbine section 30 together define a core air flowpath 38 extending from the annular inlet 20 to the jet exhaust nozzle section 72.

A low-pressure shaft 40 drivingly connects the low-pressure turbine 34 to the booster 24 to rotate the low-pressure turbine 34 and the booster 24 in unison. A gearbox assembly 100 couples the low-pressure shaft 40 to a fan shaft 42 to drive a plurality of fan blades 44 of the fan section 14. The fan shaft 42 is coupled to a fan frame 74 via a bearing 76. The fan blades 44 extend radially outward from the longitudinal centerline axis 12 in the direction R. The fan blades 44 rotate about the longitudinal centerline axis 12 via the fan shaft 42 that is powered by the low-pressure shaft 40 across the gearbox assembly 100. The gearbox assembly 100 adjusts the rotational speed of the fan shaft 42 and, thus, the fan blades 44 relative to the low-pressure shaft 40. That is, the gearbox assembly 100 is a reduction gearbox and power gearbox that delivers a torque from the low-pressure shaft 40 running at a first speed, to the fan shaft 42 coupled to fan blades 44 running at a second, slower speed.

In FIG. 1, the fan section 14 includes an annular fan casing or a nacelle 46 that circumferentially surrounds the fan blades 44 and/or at least a portion of the turbo-engine 16. The nacelle 46 is supported relative to the turbo-engine 16 by a plurality of circumferentially spaced outlet guide vanes 48. Moreover, an aft section 50 of the nacelle 46 extends circumferentially around a portion of the outer casing of the turbo-engine 16 to define a bypass airflow passage 52 therebetween.

During operation of the engine 10, a volume of air, represented by airflow 54, enters the engine 10 through an inlet 56 of the nacelle 46 and/or the fan section 14. As airflow 54 passes across the fan blades 44, a first portion of the airflow 54, represented by bypass airflow 58, is directed or is routed into the bypass airflow passage 52, and a second portion of the airflow 54, represented by core airflow 60, is directed or is routed into an upstream section of the core air flowpath 38 via the annular inlet 20. The ratio between the bypass airflow 58 and the core airflow 60 defines a bypass ratio. The pressure of the core airflow 60 is increased as the core airflow 60 is routed through the high-pressure compressor 26 and into the combustion section 28, where the now highly pressurized core airflow 60 is mixed with fuel and burned to provide combustion products or combustion gases, represented by flow 62.

The combustion gases, via flow 62, are routed into the high-pressure turbine 32 and expanded through the high-pressure turbine 32 where a portion of thermal and/or of kinetic energy from the combustion gases is extracted via sequential stages of high-pressure turbine stator vanes that are coupled to the outer casing 18 and high-pressure turbine rotor blades 64 that are coupled to the high-pressure shaft 36, thus, causing the high-pressure shaft 36 to rotate, thereby supporting operation of the high-pressure compressor 26. The combustion gases, via flow 62, are then routed into the low-pressure turbine 34 and expanded through the low-pressure turbine 34. Here, a second portion of thermal and kinetic energy is extracted from the combustion gases via sequential stages of the low-pressure turbine stator vanes that are coupled to the outer casing 18 and low-pressure turbine rotor blades 66 that are coupled to the low-pressure shaft 40, thus, causing the low-pressure shaft 40 to rotate. This thereby supports operation of the booster 24 and rotation of the fan blades 44 via the gearbox assembly 100.

The combustion gases, via flow 62, are subsequently routed through the jet exhaust nozzle section 72 downstream of the low-pressure turbine 34 to provide propulsive thrust. The high-pressure turbine 32, the low-pressure turbine 34, and the jet exhaust nozzle section 72 at least partially define a hot gas path 70 for routing the combustion gases, via flow 62, through the turbo-engine 16. Simultaneously, the pressure of the bypass airflow 58 is increased as the bypass airflow 58 is routed through the bypass airflow passage 52 before being exhausted from a fan nozzle exhaust section 68 of the engine 10, also providing propulsive thrust.

A controller 90 is in communication with the engine 10 for controlling aspects of the engine 10. For example, the controller 90 is in two-way communication with the engine 10 for receiving signals from various sensors and control systems of the engine 10 and for controlling components of the engine 10, as detailed further below. The controller 90, or components thereof, may be located onboard the engine 10, onboard the aircraft, or can be located remote from each of the engine 10 and the aircraft. The controller 90 can be a Full Authority Digital Engine Control (FADEC) that controls aspects of the engine 10.

The controller 90 may be a standalone controller or may be part of an engine controller to operate various systems of the engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The engine 10 depicted in FIG. 1 is by way of example only. In other exemplary embodiments, the engine 10 may have any other suitable configuration. For example, in other exemplary embodiments, the fan section 14 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, and/or turboshaft engines.

Figure 2:
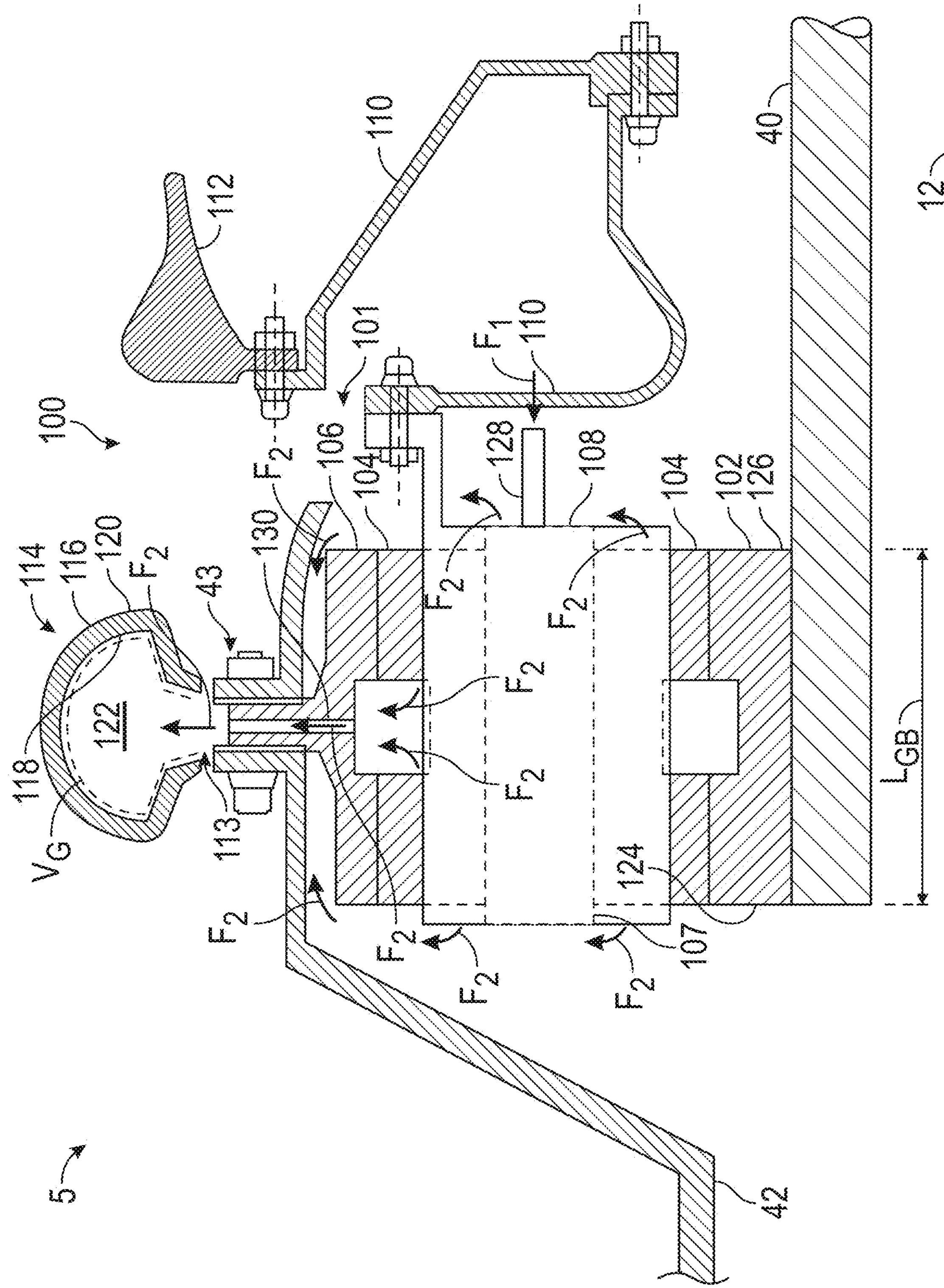
FIG. 2 illustrates a schematic, detail view of the gearbox assembly of the engine of FIG. 1, according to an embodiment of the present disclosure.
Figure 3:
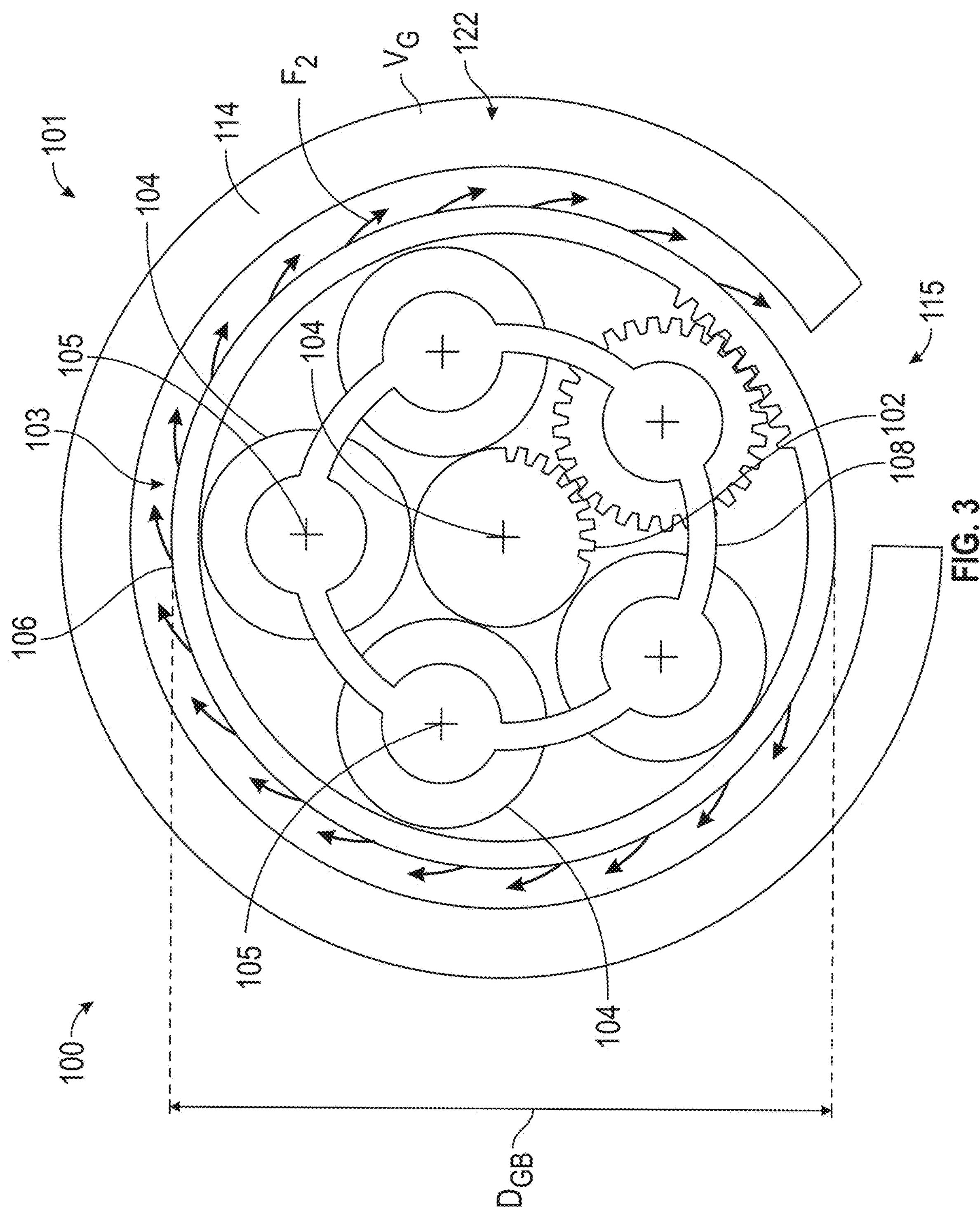
FIG. 3 illustrates a schematic, end view of the gearbox assembly of FIG. 2, taken along line 3-3 of FIG. 1, with the fan shaft omitted for clarity, according to an embodiment of the present disclosure.

FIG. 2 illustrates a detail view 5 of FIG. 1 of the gearbox assembly 100. FIG. 3 illustrates a schematic axial end view, taken along the line 3-3 of FIG. 1, of the gears of the gearbox assembly 100. The fan shaft 42 and a coupling 43 are omitted from FIG. 3 for clarity. Referring to FIGS. 2 and 3, the gearbox assembly 100 includes a gearbox 101 and a gutter 114. The gearbox 101 includes a gear assembly 103 including a sun gear 102, a plurality of planet gears 104, and a ring gear 106. The low-pressure turbine 34 (FIG. 1) drives the low-pressure shaft 40, which is coupled to the sun gear 102 of the gearbox assembly 100. The gearbox assembly 100 in turn drives the fan shaft 42.

Referring to FIG. 2, the low-pressure shaft 40 causes the sun gear 102 to rotate about the longitudinal centerline axis 12. Radially outwardly of the sun gear 102, and intermeshing therewith, is the plurality of planet gears 104 that are coupled together by a planet carrier 108. The planet carrier 108 is coupled, via a flex mount 110, to an engine frame 112. The planet carrier 108 constrains the plurality of planet gears 104 while allowing each planet gear of the plurality of planet gears 104 to rotate about a respective planet gear axis 105 (FIG. 3) on a pin 107. Radially outwardly of the plurality of planet gears 104, and intermeshing therewith, is the ring gear 106, which is an annular ring gear 106. The ring gear 106 is coupled to the fan shaft 42 at a coupling 43. The ring gear 106 is coupled via the fan shaft 42 to the fan blades 44 (FIG. 1) in order to drive rotation of the fan blades 44 about the longitudinal centerline axis 12. The gutter 114 includes a gutter wall 116 having an inner surface 118 and an outer surface 120. A gutter volume $V_G$ is defined within an interior 122 of the gutter wall 116. The gutter volume $V_G$ is illustrated by the dashed line in FIG. 2 for illustration purposes, though it is understood, the volume $V_G$ extends all the way to the inner surface 118 of the gutter 114. Although the gutter 114 is depicted with a relatively bell-like shape or tear-drop shape, any shape suitable to collecting lubricant is contemplated.

Although not depicted in FIG. 2, and shown only partially in FIG. 3 for clarity, each of the sun gear 102, the plurality of planet gears 104, and the ring gear 106 comprises teeth about their periphery to intermesh with teeth of the adjacent gears. The gearbox 101 has a gearbox diameter $D_{GB}$ defined by an outer diameter of the gearbox 101. The outer diameter of the gearbox 101 may be the outer diameter of the ring gear 106 such that the gearbox diameter $D_{GB}$ is defined by the outer diameter of the ring gear 106. Referring to FIG. 2, the sun gear 102, the plurality of planet gears 104, and the ring gear 106 are axially aligned such that a forwardmost end 124 of the gears is coplanar and an aftmost end 126 of the gears is coplanar. The gearbox 101 has an axial gearbox length $L_{GB}$ defined from the forwardmost end 124 of the gears to the aftmost end 126 of the gears.

Referring to FIG. 3, the gutter 114 may be circular and may wholly or partially circumscribe the gears of the gearbox assembly 100. For example, the gutter 114 may wholly or partially circumscribe the ring gear 106. Therefore, the gutter 114 is located radially outward of the sun gear 102, the plurality of planet gears 104, and the ring gear 106. The gutter 114 does not rotate with the gears of the gearbox assembly 100.

The gutter 114 includes a scavenge port 115 located at or near the bottom of the gutter 114. The scavenge port 115 allows lubricant collected by the gutter 114 to be removed from the gearbox assembly 100. Although shown as a large opening in the gutter 114, the scavenge port 115 may be any size or shape aperture or port that allows a flow of fluid from the interior 122 of the gutter 114 to a passage or reservoir (not depicted) outside of the gearbox assembly 100. By locating the scavenge port 115 at or near the bottom portion of the gutter 114, gravity may assist in causing the lubricant to flow toward the scavenge port 115 and, thus, may promote removal of the lubricant from the gearbox assembly 100. Once removed from the gutter 114, the lubricant may be recirculated through a lubricant channel 128 (FIG. 2) and/or collected elsewhere for disposal and/or removal.

The gearbox assembly 100 of FIGS. 2 and 3 is a star configuration gearbox assembly, in that the planet carrier 108 is held fixed (e.g., via the flex mount 110 to the engine frame 112) and the ring gear 106 is permitted to rotate. That is, the fan section 14 is driven by the ring gear 106. However, other suitable types of gearbox assembly 100 may be employed. In one non-limiting example, the gearbox assembly 100 may be a planetary configuration, in that the planet carrier 108 is coupled to the fan shaft 42 (FIG. 1) via an output shaft to rotate the fan shaft 42, with the ring gear 106 being held stationary or fixed. In this example, the fan section 14 (FIG. 1) is driven by the planet carrier 108. In another non-limiting example, the gearbox assembly 100 may be a differential gearbox in which the ring gear 106 and the planet carrier 108 are both allowed to rotate.

During engine operation, and referring to FIGS. 2 and 3, gears of the gearbox assembly 100 rotate as previously described. A lubricant is provided to lubricate the rotating parts of the gearbox assembly 100, including the sun gear 102, the plurality of planet gears 104, the ring gear 106, and the pins 107. A lubricant system (not shown for clarity) supplies a flow $F_1$, also referred to as a first lubricant flow $F_1$, of the lubricant through the lubricant channel 128 to supply lubricant to the gearbox assembly 100. As the gears of the gearbox assembly 100 rotate, centrifugal forces expel the lubricant radially outward, away from the longitudinal centerline axis 12, as shown by flow $F_2$, also referred to as a second lubricant flow $F_2$, or a gearbox scavenge flow $F_2$. The flow $F_2$ flows around the ring gear 106 and/or through a ring gear passage 130 to be collected by the gutter 114. The lubricant flows into a gutter inlet 113. In this manner, lubricant supplied through the lubricant channel 128 is collected in the gutter 114 after flowing through and around the gears and other rotating parts of the gearbox assembly 100.

Figure 4:
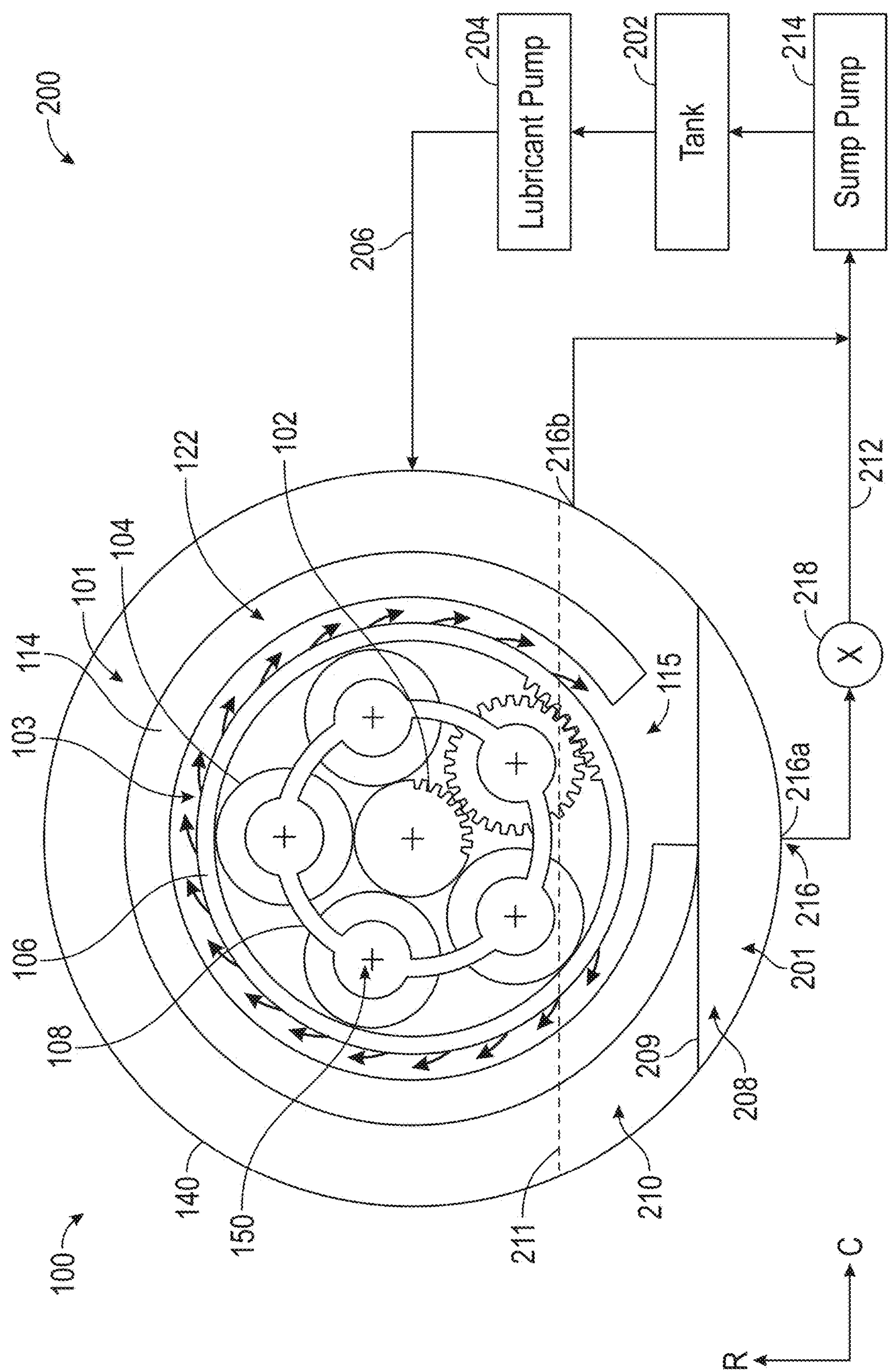
FIG. 4 is a schematic, axial end view of a lubrication system for a gearbox assembly, according to an embodiment of the present disclosure.

FIG. 4 is a schematic, axial end view of a lubrication system 200 for the gearbox assembly 100, according to an embodiment of the present disclosure. The gearbox assembly 100 includes a housing 140 (e.g., shown schematically in FIG. 4) that circumferentially surrounds the gearbox 101 and the gutter 114.

Each of the planet gears 104 includes one or more gear bearings 150 disposed therein. The one or more gear bearings 150 enable the planet gears 104 to rotate about the gear bearings 150. The gear bearings 150 can include any type of bearing for a gear, such as, for example, journal bearings, roller bearings, or the like.

The gearbox assembly 100 may be viewed with respect to a "clock" orientation having a twelve o'clock position, a three o'clock position, a six o'clock position, and a nine o'clock position, in the orientation of the gearbox assembly 100 in FIG. 4. Although not provided with reference numerals, the clock orientation is understood to include all clock positions therebetween.

The lubrication system 200 includes a tank 202 that stores lubricant 201 therein, a lubricant pump 204, and a lubricant supply line 206. Preferably, the lubricant 201 is oil. The lubricant 201 can be any type of lubricant for lubricating the gears (e.g., the sun gear 102, the planet gears 104, or the ring gear 106) or the gear bearings 150). The lubricant pump 204 is in fluid communication with the tank 202 and the lubricant supply line 206. The lubricant supply line 206 is in fluid communication with the gearbox assembly 100. The lubricant pump 204 pumps the lubricant 201 from the tank 202 to the gearbox assembly 100 through the lubricant supply line 206 for supplying the lubricant 201 to the gear assembly 103 (e.g., to the gears of the gear assembly 103 or one or more bearings of the gear assembly 103), as detailed further below. In some embodiments, the lubrication system 200 supplies the lubricant 201 from the tank 202 to the gearbox assembly 100 without a pump, for example, by gravity or by centrifugal force due to rotation of the planet carrier 108 in the planetary arrangement of the gearbox 101.

The lubrication system 200 includes a sump 208 within the engine 10 (FIG. 1) and in fluid communication with the gearbox assembly 100. In one embodiment, the sump 208 is located within the gearbox assembly 100 (e.g., within the housing 140). The sump 208 is a reservoir that collects and stores the lubricant 201 that drains from the gear assembly 103 or from the one or more gear bearings 150. The sump 208 provides a primary reservoir that stores the lubricant 201 at a first lubricant level 209. The lubrication system 200 also includes a secondary reservoir 210 that stores the lubricant at a second lubricant level 211, as detailed further below. The second lubricant level 211 is greater than the first lubricant level 209. The sump 208 includes a sump line 212 for draining the lubricant 201 from the sump 208. The sump line 212, also referred to as a scavenge line, is in fluid communication with the sump 208 and with the tank 202. In this way, the lubricant 201 drains from the sump 208 and the sump line 212 operably directs the lubricant 201 to the tank 202. In some embodiments, the lubrication system 200 includes a sump pump 214 in fluid communication with the sump 208 and the sump line 212. The sump pump 214 pumps the lubricant 201 and pumps air within the sump 208 or the sump line 212 that has leaked into the sump 208 during operation of the engine 10 (FIG. 1). The sump pump 214 is a suction pump that generates suction to pull the lubricant 201 or the air through the sump line 212 and towards the tank 202.

The sump line 212 includes a plurality of drain ports 216 that is in fluid communication with the sump 208 or the secondary reservoir 210. The plurality of drain ports 216 enables the lubricant 201 to drain from the gear assembly 103 into the sump line 212. The plurality of drain ports 216 includes a first drain port 216*a* and a second drain port 216*b*. The first drain port 216*a* is positioned at a bottom of the gearbox assembly 100 (e.g., at a bottom of the sump 208) such that the lubricant 201 can drain from the sump 208 via gravity. For example, the first drain port 216*a* is positioned at approximately the six o'clock position of the gearbox assembly 100. The second drain port 216*b* is positioned radially above the first drain port 216*a* and is in fluid communication with the secondary reservoir 210. The second drain port 216*b* is positioned approximately at the second lubricant level 211 such that the lubricant 201 drains through the second drain port 216*b* at the second lubricant level 211, as detailed further below. For example, the second drain port 216*b* is positioned between the three o'clock position and a four o'clock position of the gearbox assembly 100.

The sump line 212 also includes one or more drain valves 218 within the sump line 212. The one or more drain valves 218 are in communication with the controller 90 (FIG. 1). The controller 90 controls the one or more drain valves 218 to open and to close the one or more drain valves 218. When the one or more drain valves 218 are open, the lubricant 201 drains from the gearbox assembly 100 through the sump line 212 and into the tank 202, as detailed further below. When the one or more drain valves 218 are closed, the one or more drain valves 218 prevent the lubricant 201 from draining from the gearbox assembly 100, as detailed further below. The one or more drain valves 218 can include any type of valve that opens to allow the lubricant 201 to flow through the sump line 212 and that closes to prevent the lubricant 201 from flowing through the sump line 212. In some embodiments, the one or more drain valves 218 are in fluid communication with the lubrication system 200 and are controlled to be opened or to be closed based on a pressure signal of the lubricant 201 in the lubrication system 200 (e.g., in the lubricant supply line 206).

In operation, the low-pressure shaft 40 (FIG. 1) rotates, as detailed above, and causes the sun gear 102 to rotate. The sun gear 102, being intermeshed with the planet gears 104, causes the planet gears 104 to rotate about their corresponding axis of rotation. The planet gears 104 rotate with respect to the gear bearings 150 within the planet carrier 108. When the gear assembly 103 is the star arrangement, the planet gears 104, being intermeshed with the ring gear 106, cause the ring gear 106 to rotate about the longitudinal centerline axis 12. In such embodiments, the planet carrier 108 remains stationary such that the planet gears 104 do not rotate about the longitudinal centerline axis 12. When the gear assembly 103 is the planetary arrangement, the ring gear 106 is stationary in and the planet carrier 108, and the planet gears 104, rotate about the longitudinal centerline axis 12. When the gear assembly 103 is the differential gear assembly, both the planet carrier 108 (e.g., the planet gears 104) and the ring gear 106 rotate about the longitudinal centerline axis 12.

As the gears of the gear assembly 103 rotate, the lubrication system 200 supplies the lubricant 201 to the gears or to the gear bearings 150 to lubricate the gears or the gear bearings 150. During operation of the engine 10 (FIG. 1), the lubricant pump 204 pumps the lubricant 201 from the tank 202 and into the gearbox assembly 100 through the lubricant supply line 206. The lubrication system 200 supplies the lubricant 201 to the gears of the gear assembly 103 or to the gear bearings 150. For example, the lubricant supply line 206 is in fluid communication with the gears of the gear assembly 103 or with the gear bearings 150.

The lubricant 201 drains from the gear assembly 103 and into the sump 208. In particular, the lubricant 201 is directed into the gutter 114, and the gutter 114 directs the lubricant 201 into the sump 208 through the scavenge port 115. During operation of the engine 10, the lubricant 201 fills the sump 208 to the first lubricant level 209. The first lubricant level 209 is below the gear assembly 103 such that the lubricant 201 in the sump 208 is prevented from contacting the gears of the gear assembly 103 while the lubricant 201 is stored in the sump 208. The lubricant 201 in the sump 208 is drained from the sump 208 through the sump line 212. For example, the one or more drain valves 218 are opened during operation of the engine 10, and the lubricant pump 204 (or the sump pump 214 or a scavenge pump) pumps the lubricant 201 from the sump 208 through the sump line 212 and re-circulates the lubricant 201 through the lubrication system 200 (e.g., through the lubricant supply line 206) and the gearbox assembly 100. In this way, the lubricant 201 can be re-used to lubricate the gears of the gear assembly 103 or the gear bearings 150 of the gear assembly 103. The lubrication system 200 can also supply the lubricant 201 to other components of the gearbox assembly 100, or to other components of the engine 10 (FIG. 1).

In some instances, the lubrication system 200 may be unable to provide the lubricant 201 to the gearbox assembly 100. For example, the lubrication system 200 may be unable to pressurize the lubricant 201 to supply the lubricant 201 to the gearbox assembly 100 during windmilling while the engine 10 is shut down or during a failure of the engine 10 or the lubrication system 200 (e.g., the lubricant pump 204 fails) while in-flight. In such instances, the windmilling may cause the shafts of the engine 10 to rotate, thereby causing the gear assembly 103 to rotate. The gears of the gear assembly 103 or the gear bearings 150 can become damaged if there is not enough lubricant 201 supplied to the gears or to the gear bearings 150.

Accordingly, during such instances, the one or more drain valves 218 close such that the lubricant 201 drains from the gear assembly 103 and fills the secondary reservoir 210 to the second lubricant level 211. The second drain port 216*b* drains the lubricant 201 such that the second drain port 216*b* ensures that the lubricant 201 does not fill the secondary reservoir 210 beyond the second lubricant level 211. The second lubricant level 211 is positioned such that the lubricant 201 in the secondary reservoir 210 contacts at least a portion of gears of the gear assembly 103. For example, the lubricant 201 in the secondary reservoir 210 contacts at least a portion of the planet gears 104. In this way, the gears of the gear assembly 103 collect the lubricant 201 in the secondary reservoir 210 as the gears of the gear assembly 103 rotate through the secondary reservoir 210. For example, as the planet gears 104 or the ring gear 106 rotates through the lubricant 201 within the secondary reservoir 210, at least a portion of the lubricant 201 collects on the planet gears 104 or the ring gear 106. The rotation of the gears of the gear assembly 103 distributes the lubricant 201 to the gears of the gear assembly 103 or to the gear bearings 150. In this way, the lubrication system 200 supplies the lubricant 201 to the gears of the gear assembly 103 or to the gear bearings 150 even if the lubricant supply line 206 loses pressure and the lubrication system 200 is unable to supply the lubricant 201 through the lubricant supply line 206.

The second lubricant level 211 can be variable. For example, the secondary reservoir 210 can be filled with lubricant 201 to any level between the first lubricant level 209 and the second lubricant level 211 as long as the secondary reservoir 210 is filled with enough lubricant 201 such that at least one of the gears of the gear assembly 103 contact the lubricant 201 within the secondary reservoir 210. The one or more drain valves 218 open and close to vary the level of the second lubricant level 211. For example, the one or more drain valves 218 close to fill the secondary reservoir 210 with the lubricant 201, and can open to allow the lubricant 201 to drain through the first drain port 216*a* when the lubricant 201 is at a desired level within the secondary reservoir 210. In some embodiments, the lubrication system 200 includes a second drain valve in fluid communication with the second drain port 216*b* such that the second drain port 216*b* can be opened and closed separately from, or in combination with, the first drain port 216*a*.

In some embodiments, the one or more drain valves 218 are controlled by at least one of a pressure of the lubricant 201, a pressure of fuel in the engine 10, or a pressure of hydraulics of the engine 10 (e.g., hydraulics for controlling control surfaces of the aircraft). For example, the one or more drain valves 218 open when the at least one of the pressure of the lubricant 201, the pressure of the fuel in the engine 10, or the pressure of the hydraulics of the engine 10 increases above a predetermined pressure threshold. The predetermined pressure threshold is determined based on a predetermined operating speed of the engine 10 (e.g., a speed of the turbo-engine 16 or a speed of the fan section 14). The one or more drain valves 218 close when the at least one of the pressure of the lubricant 201, the pressure of the fuel in the engine 10, or the pressure of the hydraulics of the engine 10 decreases below the predetermined pressure threshold. The at least one of the pressure of the lubricant 201, the pressure of the fuel in the engine 10, or the pressure of the hydraulics of the engine 10 is based on a speed of the turbo-engine 16. For example, when a speed of the turbo-engine 16 (e.g., the high-pressure shaft 36 or the low-pressure shaft 40 shown in FIG. 1) is greater than a speed threshold, the at least one of the pressure of the lubricant 201, the pressure of the fuel in the engine 10, or the pressure of the hydraulics of the engine 10 is greater than the predetermined pressure threshold. Similarly, when the speed of the turbo-engine 16 is less than the speed threshold, the at least one of the pressure of the lubricant 201, the pressure of the fuel in the engine 10, or the pressure of the hydraulics of the engine 10 is less than the predetermined pressure threshold. In some embodiments, the speed threshold of the turbo-engine 16 is at least 5% of a maximum speed of the turbo-engine 16. In some embodiments, the speed threshold of the turbo-engine 16 is approximately 5% to approximately 10% of the maximum speed of the turbo-engine 16. The speed threshold can include any value up to the maximum speed of the turbo-engine 16 for determining when to open the one or more drain valves 218.

In some embodiments, the one or more drain valves 218 are controlled by the controller 90 (FIG. 1). For example, the controller 90 controls the one or more drain valves 218 to open and to close the one or more drain valves 218. In such embodiments, the one or more drain valves 218 are electrically energized valves, such as, for example, a solenoid valve. In some embodiments, the one or more drain valves 218 open when the controller 90 turns on, and the one or more drain valves 218 close when the controller 90 turns off (e.g., during a shutdown of the engine 10). The controller 90 turns on when the speed of the turbo-engine 16 is greater than the speed threshold. The engine 10 provides power to the controller 90 to turn the controller 90 on when the speed of the turbo-engine 16 is greater than the speed threshold. The controller 90 turns off when the speed of the turbo-engine 16 is less than the speed threshold.

Figure 5A:
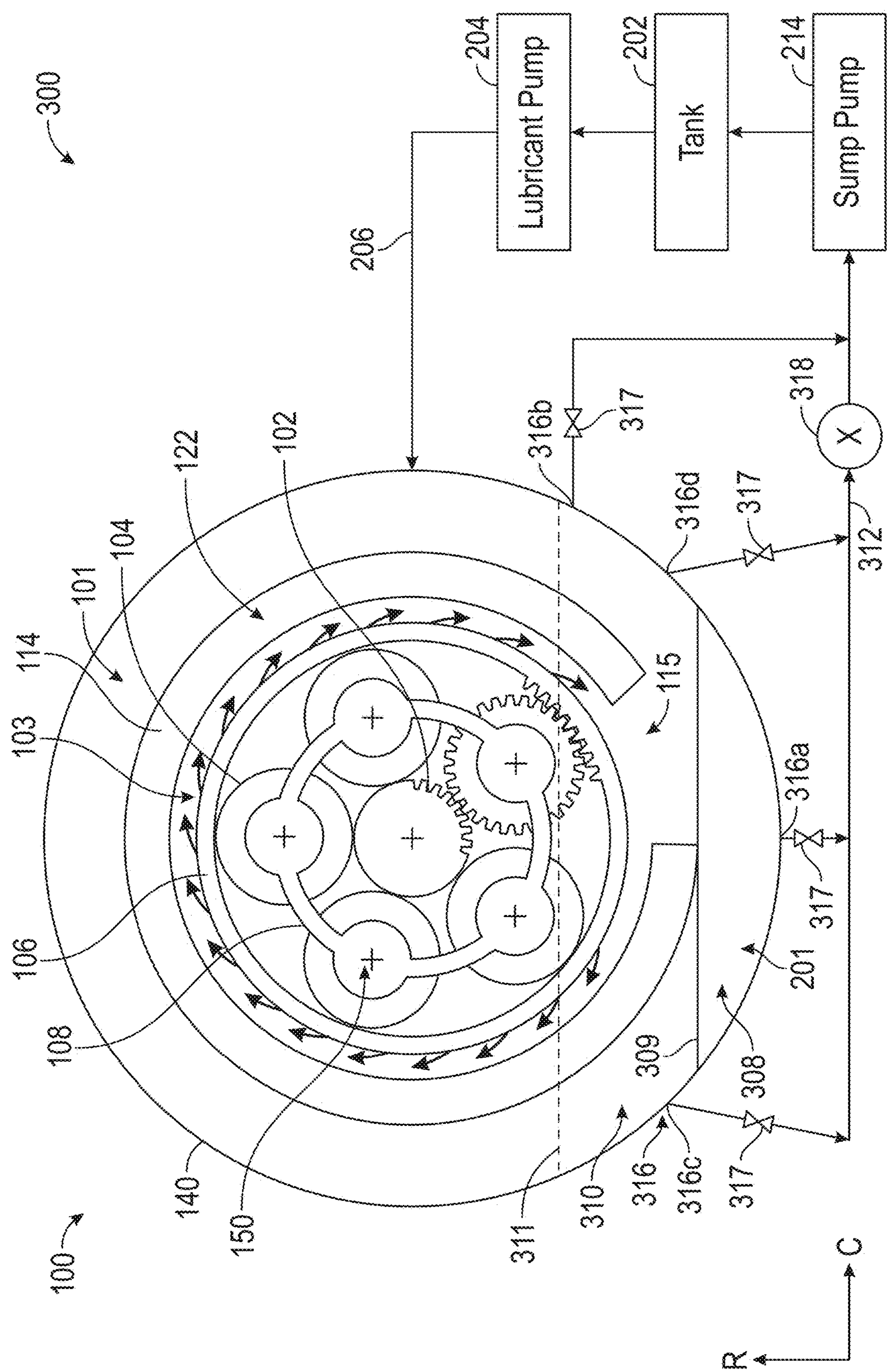
FIG. 5A is a schematic, axial end cross-sectional view of a lubrication system for a gearbox assembly, according to an embodiment of the present disclosure.
Figure 5B:
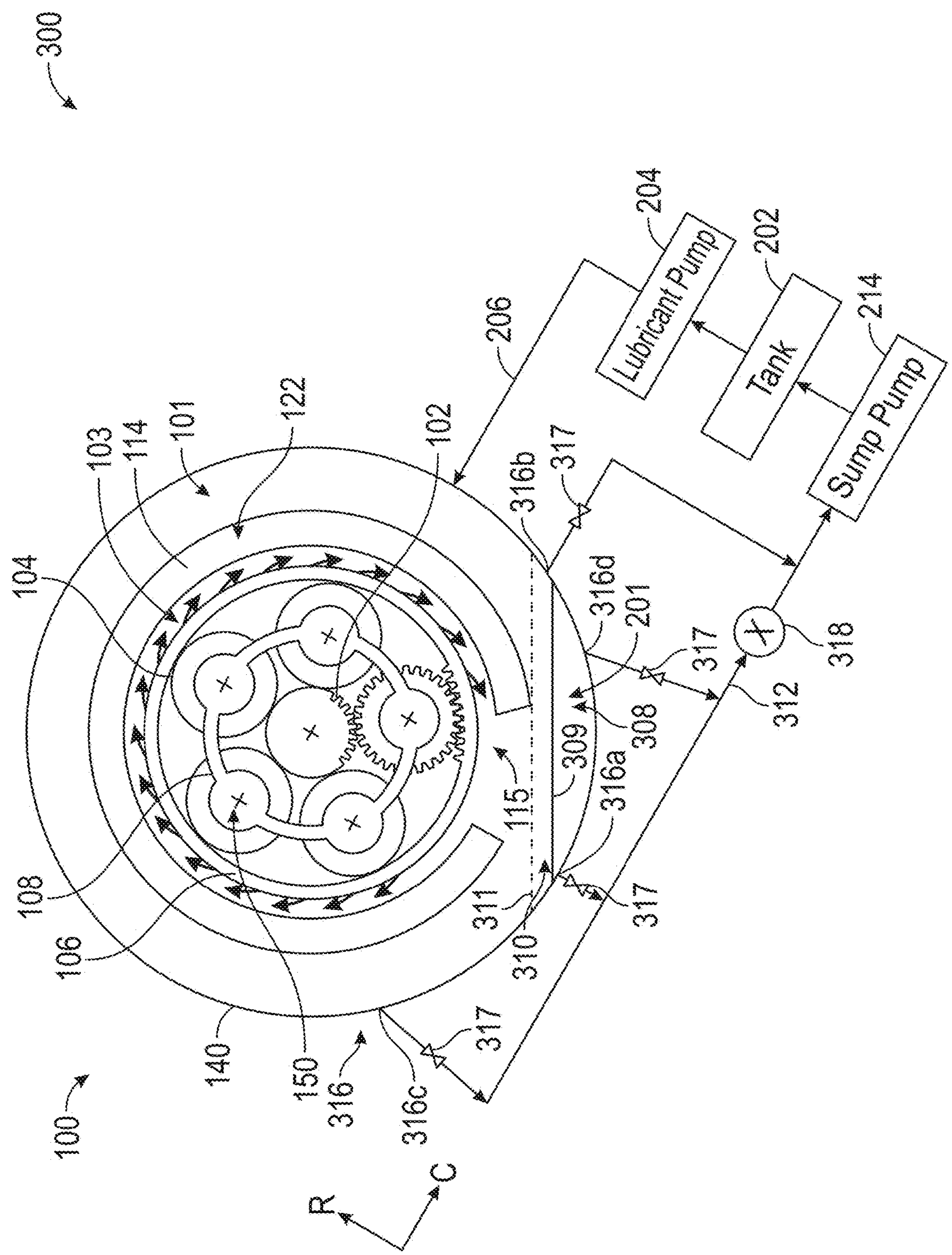
FIG. 5B is a schematic, axial end cross-sectional view of the lubrication system for the gearbox assembly of FIG. 5A, according to an embodiment of the present disclosure.
Figure 5C:
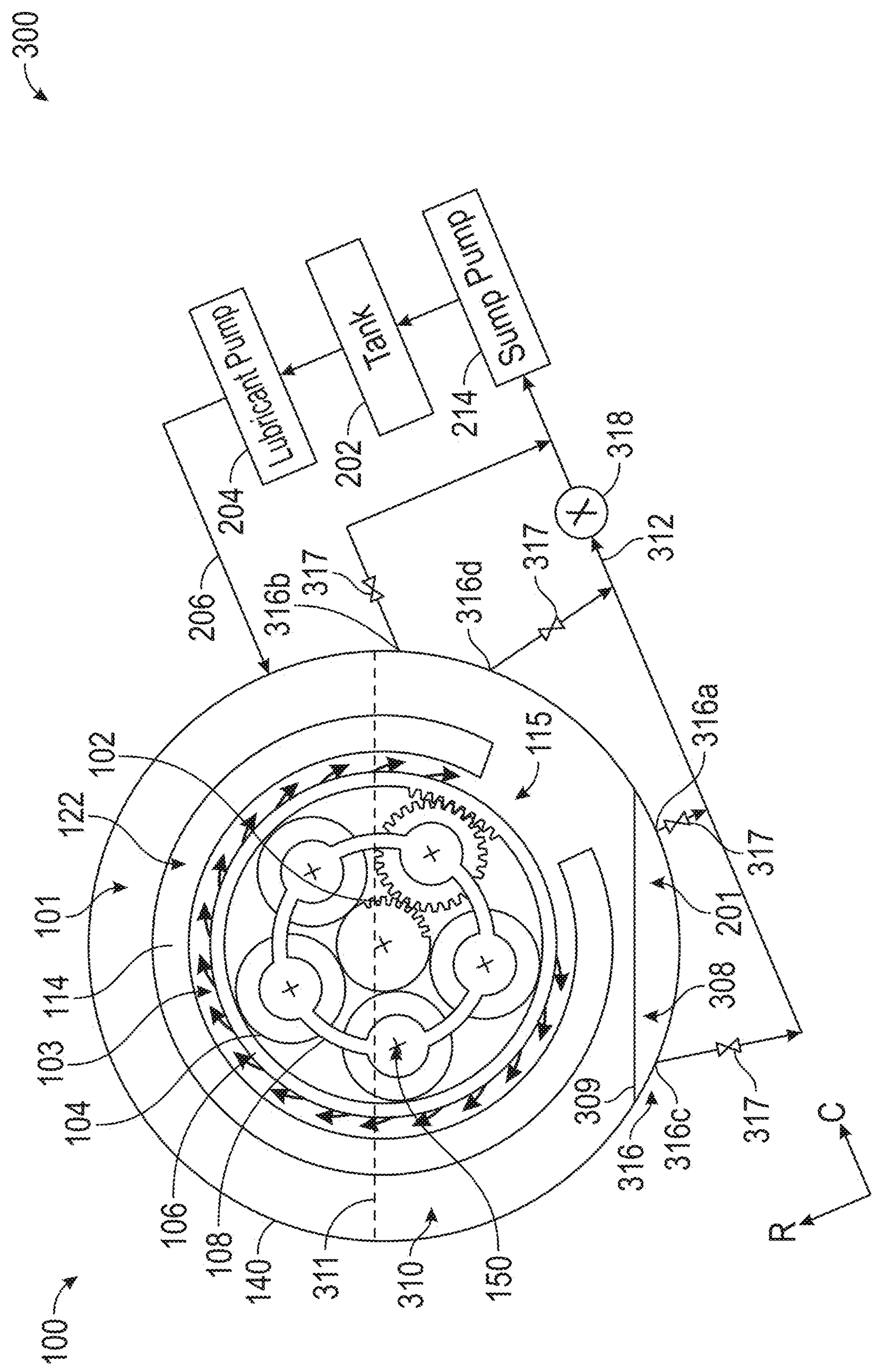
FIG. 5C is a schematic, axial end cross-sectional view of the lubrication system for the gearbox assembly of FIG. 5A, according to an embodiment of the present disclosure.

FIGS. 5A to 5C are schematic, axial end cross-sectional views of a lubrication system 300 for the gearbox assembly 100, according to another embodiment. FIG. 5A shows the gearbox assembly 100 in a first rotational position. FIG. 5B shows the gearbox assembly 100 in a second rotational position. FIG. 5C shows the gearbox assembly 100 in a third rotational position. The lubrication system 300 includes many of the same components or similar components as the lubrication system 200 shown in FIG. 4.

The lubrication system 300 includes a sump 308 having a first lubricant level 309, a sump line 312, a plurality of drain ports 316, one or more drain valves 318, and a secondary reservoir 310 having a second lubricant level 311. The sump 308 and the secondary reservoir 310 are substantially similar to the sump 208 and the secondary reservoir 210 shown in FIG. 4, respectively. The plurality of drain ports 316 includes a first drain port 316*a*, a second drain port 316*b*, a third drain port 316*c*, and a fourth drain port 316*d*. The first drain port 316*a* and the second drain port 316*b* are substantially similar to the first drain port 216*a* and the second drain port 216*b* shown in FIG. 4. For example, the first drain port 316*a* is positioned at the bottom of the gearbox assembly 100 (e.g., at a bottom of the sump 308) and the second drain port 316*b* is positioned radially above the first drain port 316*a*. For example, the second drain port 316*b* is positioned approximately at the second lubricant level 311 such that the lubricant 201 drains through the second drain port 316*b* at the second lubricant level 311. In this way, the first drain port 316*a* is positioned approximately at the six o'clock position of the gearbox assembly 100, and the second drain port 316*b* is positioned between the three o'clock position and a four o'clock position of the gearbox assembly 100.

The third drain port 316*c* and the fourth drain port 316*d* help to drain the lubricant 201 from the sump 308 and/or from the secondary reservoir 310 when the gearbox assembly 100 changes rotational position. The third drain port 316*c* and the fourth drain port 316*d* are positioned radially between the first drain port 316*a* and the second drain port 316*b*. The third drain port 316*c* is positioned on a first circumferential side of the first drain port 316*a* and the fourth drain port 316*d* is positioned on a second circumferential side of the first drain port 316*a*. For example, the third drain port 316*c* is positioned between the six o'clock position and the nine o'clock position of the gearbox assembly 100. The fourth drain port 316*d* is positioned between the first drain port 316*a* and the second drain port 316*b*. For example, the fourth drain port 316*d* is positioned between the six o'clock position and the three o'clock position of the gearbox assembly 100.

The lubrication system 300 and the gearbox assembly 100 operate substantially similarly as do the lubrication system 200 and the gearbox assembly 100 shown in FIG. 4, respectively. The third drain port 316*c* and the fourth drain port 316*d* allow the lubricant 201 to drain from at least one of the sump 308 or the secondary reservoir 310 even if the gearbox assembly 100 changes rotational position. For example, when the gas turbine engine (e.g., the engine 10 shown in FIG. 1) powers an aircraft, the aircraft turns, banks, or rolls such that the gas turbine engine, and, thus, the gearbox assembly 100 changes the rotational position. When the aircraft is operating at level flight (e.g., the aircraft is not turning, not banking, or not rolling), the gearbox assembly 100 is in the first rotational position shown in FIG. 5A such that the six o'clock position of the gearbox assembly 100 is substantially at the bottom of the gearbox assembly 100. In such an orientation, the lubricant 201 drains from at least one of the sump 308 or the secondary reservoir 310 through the first drain port 316*a* when the one or more drain valves 318 are open.

When the aircraft turns, banks, or rolls left, the gearbox assembly 100 is in the second rotational position shown in FIG. 5B such that the six o'clock position of the gearbox assembly 100 rotates left. In such an orientation, the fourth drain port 316*d* is positioned at approximately the lowest point of the gearbox assembly 100 such that the lubricant 201 drains from at least one the sump 308 or the secondary reservoir 310 through the fourth drain port 316*d* when the one or more drain valves 318 are open. The lubricant 201 can also drain through the first drain port 316*a* in such a configuration if a level of the lubricant 201 in at least one of the sump 308 or the secondary reservoir 310 is at the first drain port 316*a*. The lubricant 201 can also drain through the second drain port 316*b* in such a configuration if a level of the lubricant 201 in at least one of the sump 308 or the secondary reservoir 310 is at the fourth drain port 316*d*.

When the aircraft turns, banks, or rolls right, the gearbox assembly 100 is in the third rotational position shown in FIG. 5C such that the six o'clock position of the gearbox assembly 100 rotates right. In such an orientation, the third drain port 316*c* is positioned at approximately the lowest point of the gearbox assembly 100 such that the lubricant 201 drains from at least one of the sump 308 or the secondary reservoir 310 through the third drain port 316*c* when the one or more drain valves 318 are open. The lubricant 201 can also drain through the first drain port 316*a* in such a configuration if a level of the lubricant 201 in at least one of the sump 308 or the secondary reservoir 310 is at the first drain port 316*a*.

Accordingly, the lubricant 201 can drain through the sump line 312 regardless of the rotational position of the gearbox assembly 100. The plurality of drain ports 316 can include any number of drain ports 316 positioned between the second lubricant level 311 and the first drain port 316*a* for allowing the lubricant 201 to drain from at least one of the sump 308 or the secondary reservoir 310 in any rotational position of the gearbox assembly 100. In some embodiments, each drain port 316 includes a drain valve 317 in fluid communication with the respective drain port 316. In this way, the drain valve 317 of each drain port 316 can be opened to allow the lubricant 201 to drain through the respective drain port 316 and can be closed to prevent the lubricant 201 from draining through the respective drain port 316.

Figure 6:
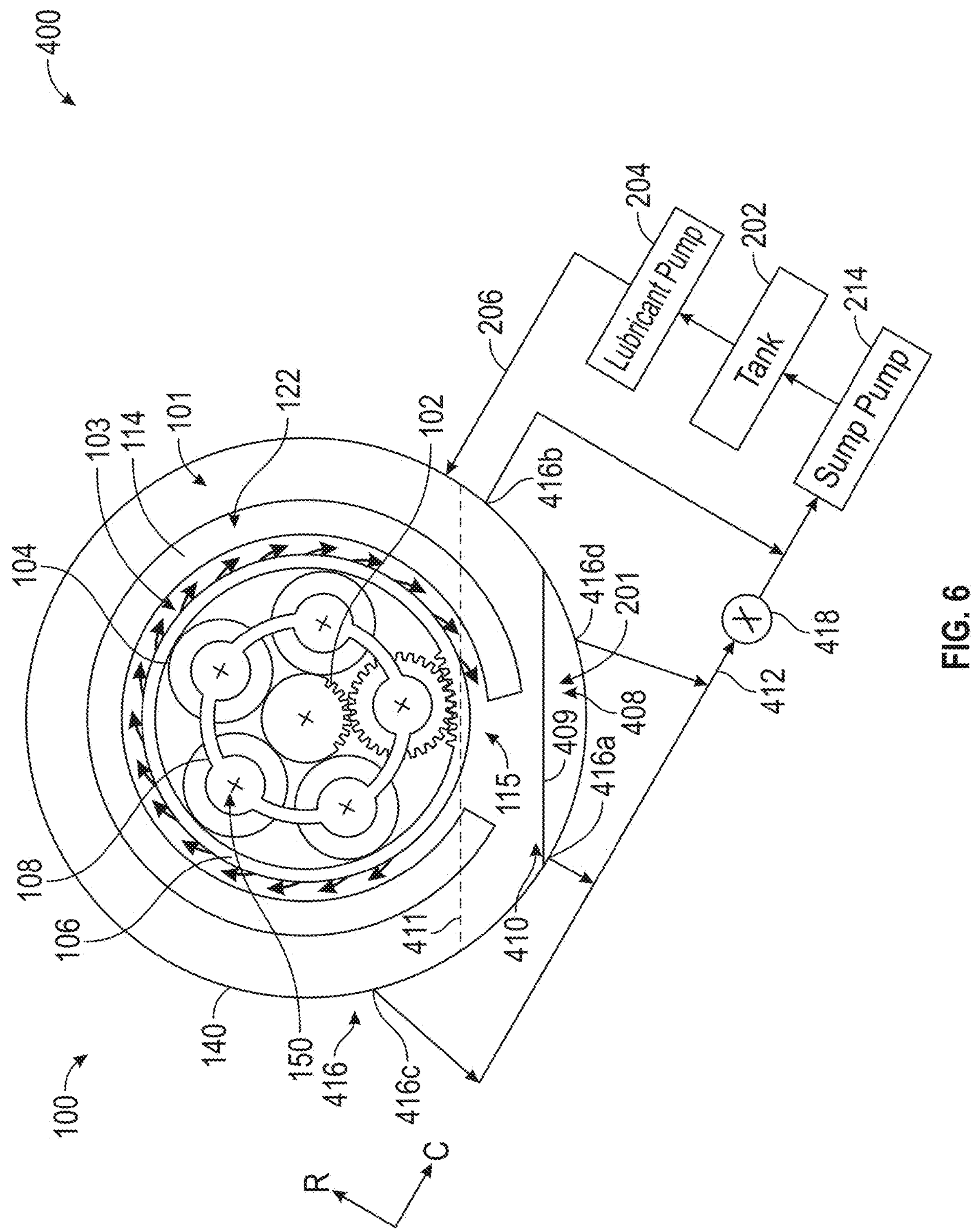
FIG. 6 is a schematic, axial end cross-sectional view of a lubrication system for a gearbox assembly, according to an embodiment of the present disclosure.

FIG. 6 is a schematic, axial end cross-sectional view of a lubrication system 400 for the gearbox assembly 100, according to another embodiment. FIG. 6 shows the gearbox assembly 100 in the second rotational position. The lubrication system 400 includes many of the same components or similar components as the lubrication system 300 of FIGS. 5A to 5C.

The lubrication system 400 includes a sump 408 having a first lubricant level 409, a sump line 412, a plurality of drain ports 416, one or more drain valves 418, and a secondary reservoir 410 having a second lubricant level 411. The sump 408 and the secondary reservoir 410 are substantially similar to the sump 308 and the secondary reservoir 310 of FIGS. 5A to 5C, respectively. The plurality of drain ports 416 includes a first drain port 416*a*, a second drain port 416*b*, a third drain port 416*c*, and a fourth drain port 416*d*. The first drain port 416*a*, the third drain port 416*c*, and the fourth drain port 416*d* are substantially similar to the first drain port 316*a*, the third drain port 316*c*, and the fourth drain port 316*d* of FIGS. 3A to 3C. A position of the second drain port 416*b*, however, is different than the position of the second drain port 316*b*, respectively, of FIGS. 3A to 3C. In particular, the second drain port 416*b* is positioned approximately at the three o'clock position. Such a configuration helps to prevent the lubricant 201 from draining from the gearbox assembly 100 during an in-flight shutdown of the gas turbine engine (e.g., the engine 10 shown in FIG. 1) while the engine 10 is windmilling and the gearbox assembly 100 is in the second rotational position or in the third rotational position (e.g., the aircraft is turning, banking, or rolling left or right).

Figure 7A:
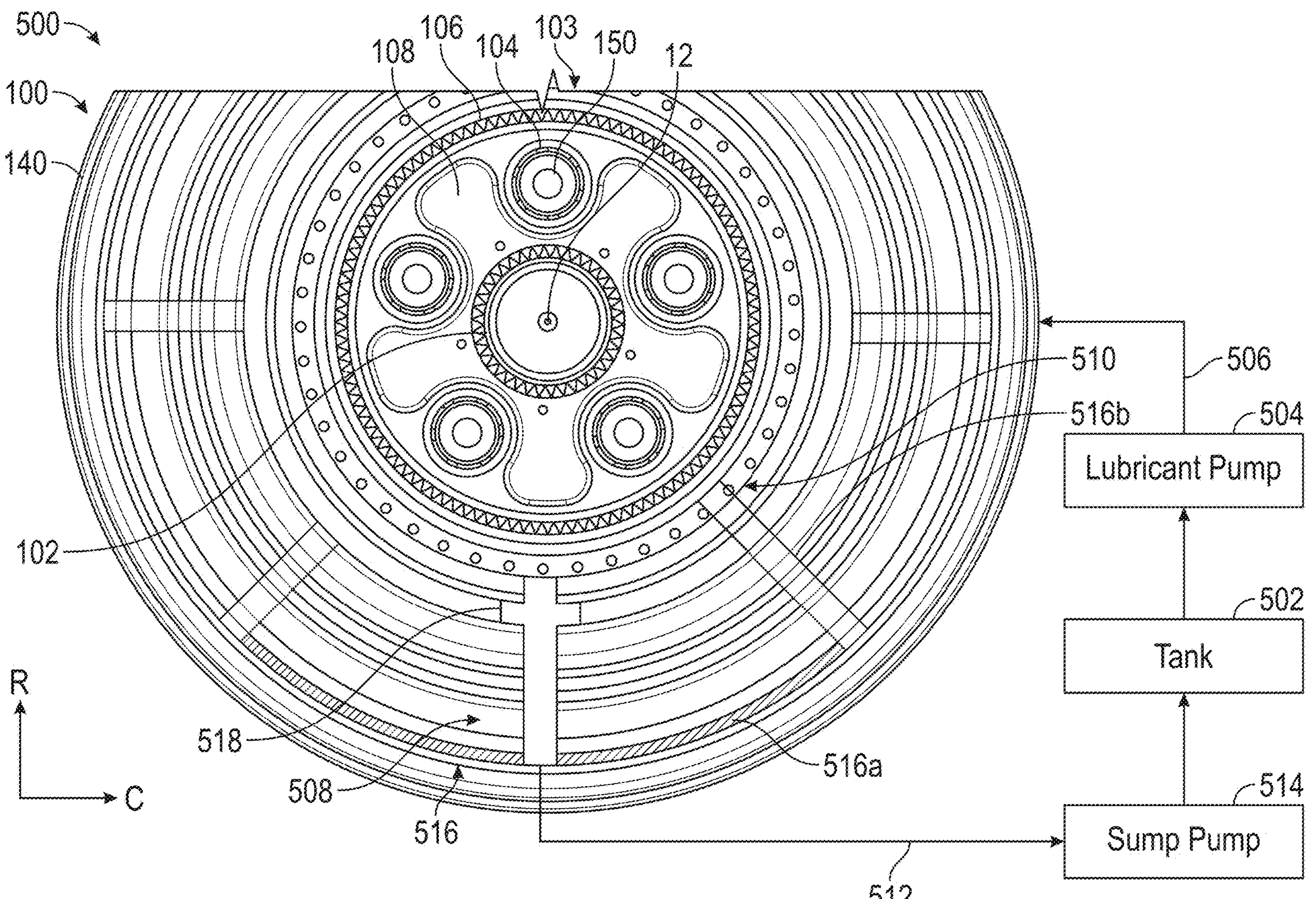
FIG. 7A is a schematic, axial end cross-sectional view of a lubrication system for a gearbox assembly, according to an embodiment of the present disclosure.
Figure 7B:
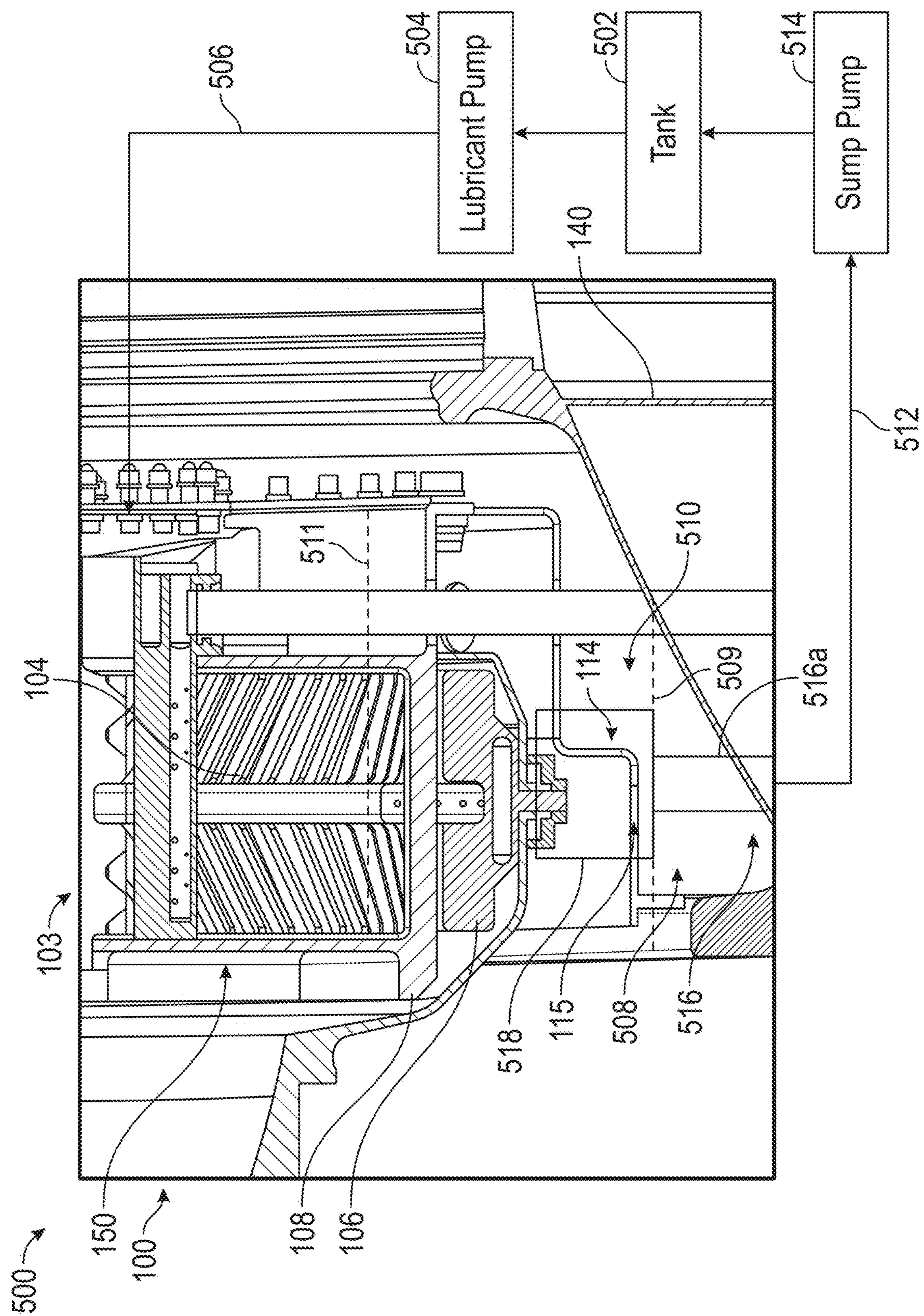
FIG. 7B is a schematic, front side cross-sectional view of the lubrication system and the gearbox assembly of FIG. 7A, according to an embodiment of the present disclosure.

FIG. 7A is a schematic, axial end cross-sectional view of a lubrication system 500 for the gearbox assembly 100, according to another embodiment. FIG. 7B is a schematic, front side cross-sectional view of the lubrication system 500 and the gearbox assembly 100 shown in FIG. 7A, according to the present disclosure. The lubrication system 500 includes many of the same components or similar components as the lubrication system 200 shown in FIG. 4.

The lubrication system 500 includes a tank 502, a lubricant pump 504, and a lubricant supply line 506. The lubrication system 500 also includes a sump 508 having a first lubricant level 509 (FIG. 7B), a secondary reservoir 510 having a second lubricant level 511 (FIG. 7B), a sump line 512, a sump pump 514, a plurality of drain ports 516, and one or more drain valves 518. The plurality of drain ports 516 includes a first drain port 516*a* and a second drain port 516*b*. The first drain port 516*a* is a strut drain that forms a portion of a strut. The lubrication system 500 operates substantially similarly as the lubrication system 200 shown in FIG. 4.

Figure 8:
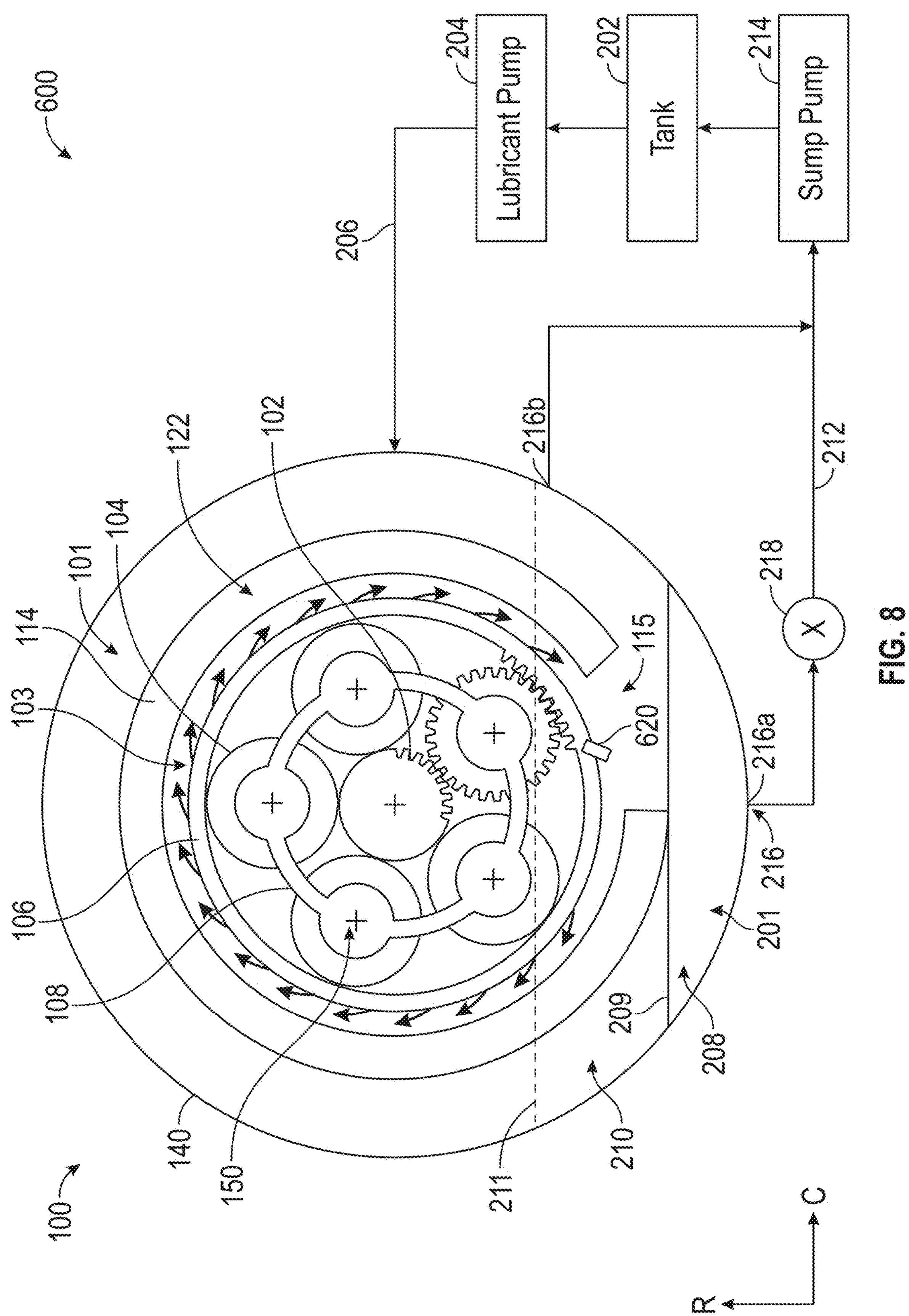
FIG. 8 is a schematic, axial end cross-sectional view of a lubrication system for a gearbox assembly, according to an embodiment of the present disclosure.

FIG. 8 is a schematic axial, end cross-sectional view of a lubrication system 600 for the gearbox assembly 100, according to another embodiment. The lubrication system 600 includes many of the same components or similar components as the lubrication system 200 shown in FIG. 4.

The lubrication system 600 includes one or more scuppers 620. The one or more scuppers 620 are scoops that scoop the lubricant 201 within the secondary reservoir 210 onto one or more gears of the gear assembly 103. The one or more scuppers 620 are coupled to the ring gear 106. The lubrication system 600 operates substantially similarly as to the lubrication system 200 shown in FIG. 4.

The one or more scuppers 620 rotate and, as the one or more scuppers 620 rotate, the one or more scuppers 620 pass through the lubricant 201 within the secondary reservoir 210 and scoop, or collect, a portion of the lubricant 201 therein. Rotation of the ring gear 106 causes the one or more scuppers 620 to rotate. The one or more scuppers 620 continue to rotate after collecting the portion of the lubricant 201 and distribute the lubricant 201 to at least one of the gears of the gear assembly 103.

Figure 9:
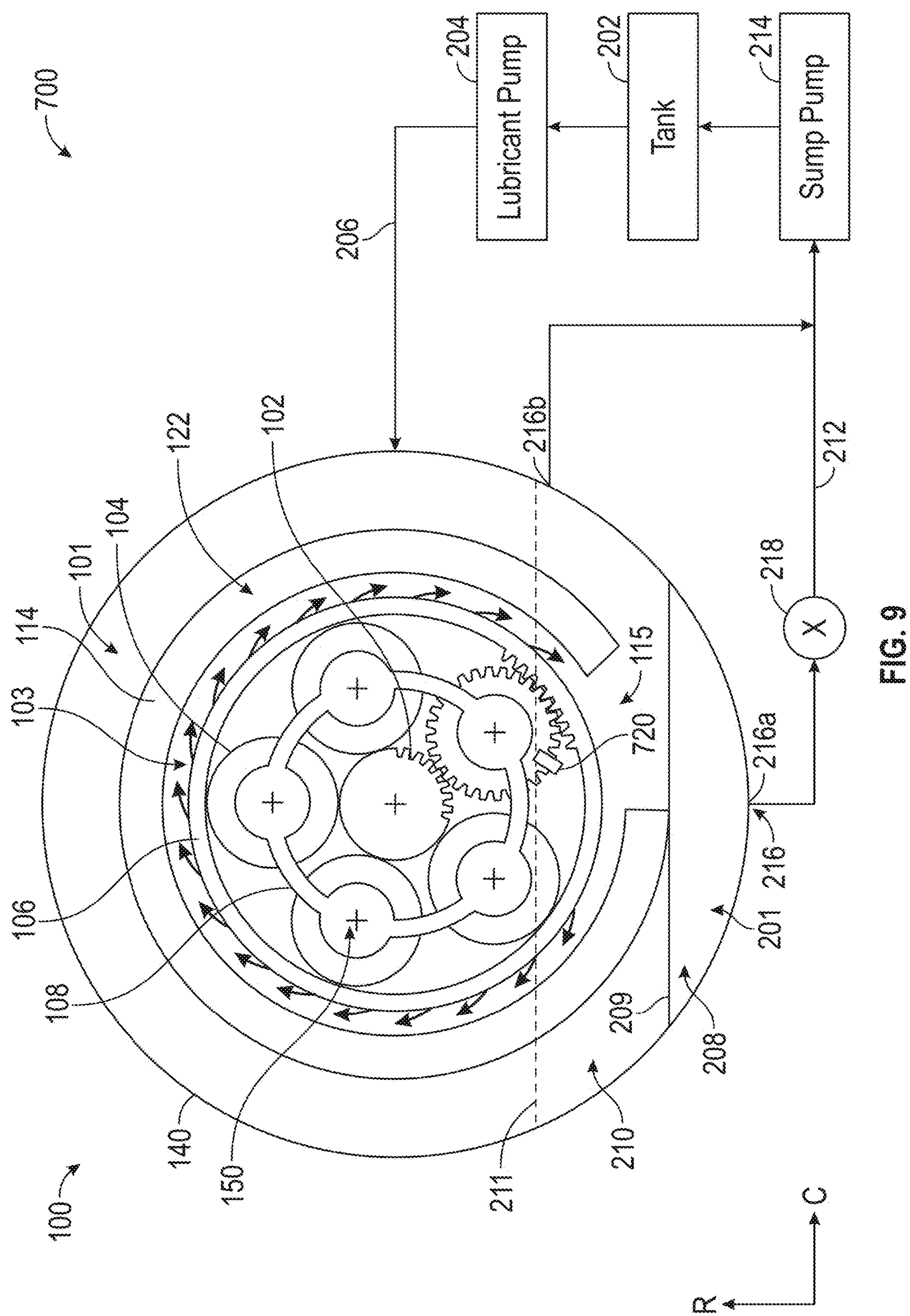
FIG. 9 is a schematic, axial end cross-sectional view of a lubrication system for a gearbox assembly, according to an embodiment of the present disclosure.

FIG. 9 is a schematic, axial end cross-sectional view of a lubrication system 700 for the gearbox assembly 100, according to another embodiment. The lubrication system 700 includes many of the same components or similar components as the lubrication system 200 shown in FIG. 4.

The lubrication system 700 includes one or more scuppers 720. The one or more scuppers 720 are scoops that scoop the lubricant 201 within the secondary reservoir 210 onto one or more gears of the gear assembly 103. The one or more scuppers 720 are coupled to at least one of the planet gears 104. The lubrication system 700 operates substantially similarly as to the lubrication system 200 shown in FIG. 4.

The one or more scuppers 720 rotate and, as the one or more scuppers 720 rotate, the one or more scuppers 720 pass through the lubricant 201 within the secondary reservoir 210 and scoop, or collect, a portion of the lubricant 201 therein. Rotation of the planet gears 104 causes the one or more scuppers 720 to rotate. The one or more scuppers 720 continue to rotate after collecting the portion of the lubricant 201 and distribute the lubricant 201 to at least one of the gears of the gear assembly 103.

As the volume of the gearbox 101 increases, the diameter of the gearbox $D_{GB}$, increases. As the power output of the gearbox 101 increases the amount of heat generated increases. The increase in heat generation increases the volume of lubricant required to operate the gearbox, which calls for an increased gutter volume $V_G$ for capture and recirculation of lubricant through the scavenging system. However, it is also desired to reduce the overall footprint of the gearbox, oil and scavenge system given an emphasis on decreasing packaging space available for the gearbox and oil scavenge system, especially for engines with power gearboxes operating with relatively high gear ratios, e.g., between, inclusive of the endpoints, 2.5 to 3.5, 3.0, 3.25, 4.0 and above gear ratios (GRs).

In view of the foregoing, it is desirable to improve, or at least maintain, a target efficiency of a gearbox without oversizing a gutter or scavenge system, or while reducing its size to accommodate only what is needed or can be accommodated in terms of weight increase or volume. When developing a gas turbine engine, the interplay among components can make it particularly difficult to select or to develop one component (e.g., the gutter 114) during engine design and prototype testing, especially, when some components are at different stages of completion. For example, one or more components may be nearly complete, yet one or more other components may be in an initial or preliminary phase. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan section 14 design, compressor section 22 design, combustion section 28, and/or turbine section 30 design, may not be known at the time of design of the gutter, but such components impact the size of the gearbox 101 required and the amount of lubricant required, and thus, the design of the gutter 114.

The inventors desire to arrive at a more favorable balance between maximizing gearbox scavenge flow collection while minimizing other, potential negative effects on an improperly chosen gutter size had previously involved, e.g., the undertaking of multivariate trade studies, which may or may not have yielded an improved, or best match gutter/scavenge for a particular architecture. Unexpectedly, it was discovered that a relationship exists between the volume of the gutter and gearbox volume that uniquely identified a finite and readily ascertainable (in view of this disclosure) number of embodiments suited for a particular architecture, which improves the weight-volume-scavenge effectiveness tradeoffs for a particular architecture. This relationship the inventors refer to as the Lubricant Extraction Volume Ratio (LEVR):

$$LEVR = \frac{V_G}{V_{GB}} \quad (1)$$

$V_G$ represents the gutter volume, as identified with respect to FIGS. 2 and 3. The gutter volume may be determined by calculating the volume within a cross section of the gutter. $V_{GB}$ represents the gearbox volume, which is defined below (2). For engine power between eighteen kHP and thirty-five kHP, inclusive of the endpoints, the gearbox volume $V_{GB}$ is between eight hundred $in^3$ and two thousand $in^3$, inclusive of the endpoints. In some examples, the engine is a turbofan engine. The inventors found that the gutter volume $V_G$ should be selected based on the range 0.01≤LEVR≤to 0.3 (gutter volume is between 1 percent and 30 percent the gearbox volume, inclusive of the endpoints).

$$V_{GB} = L_{GB} * \pi * \left(\frac{D_{GB}}{2}\right)^2 \quad (2)$$

$L_{GB}$ represents the gearbox length, as identified with respect to FIG. 2. Although described with respect to gears of the same length in FIG. 2, the gearbox length may be defined by any of the sun gear 102, a planet gear 104, or the ring gear 106, instances when the aforementioned gears are of different lengths. In (2), $D_{GB}$ represents the gearbox diameter, as identified with respect to FIG. 3.

Figure 10:
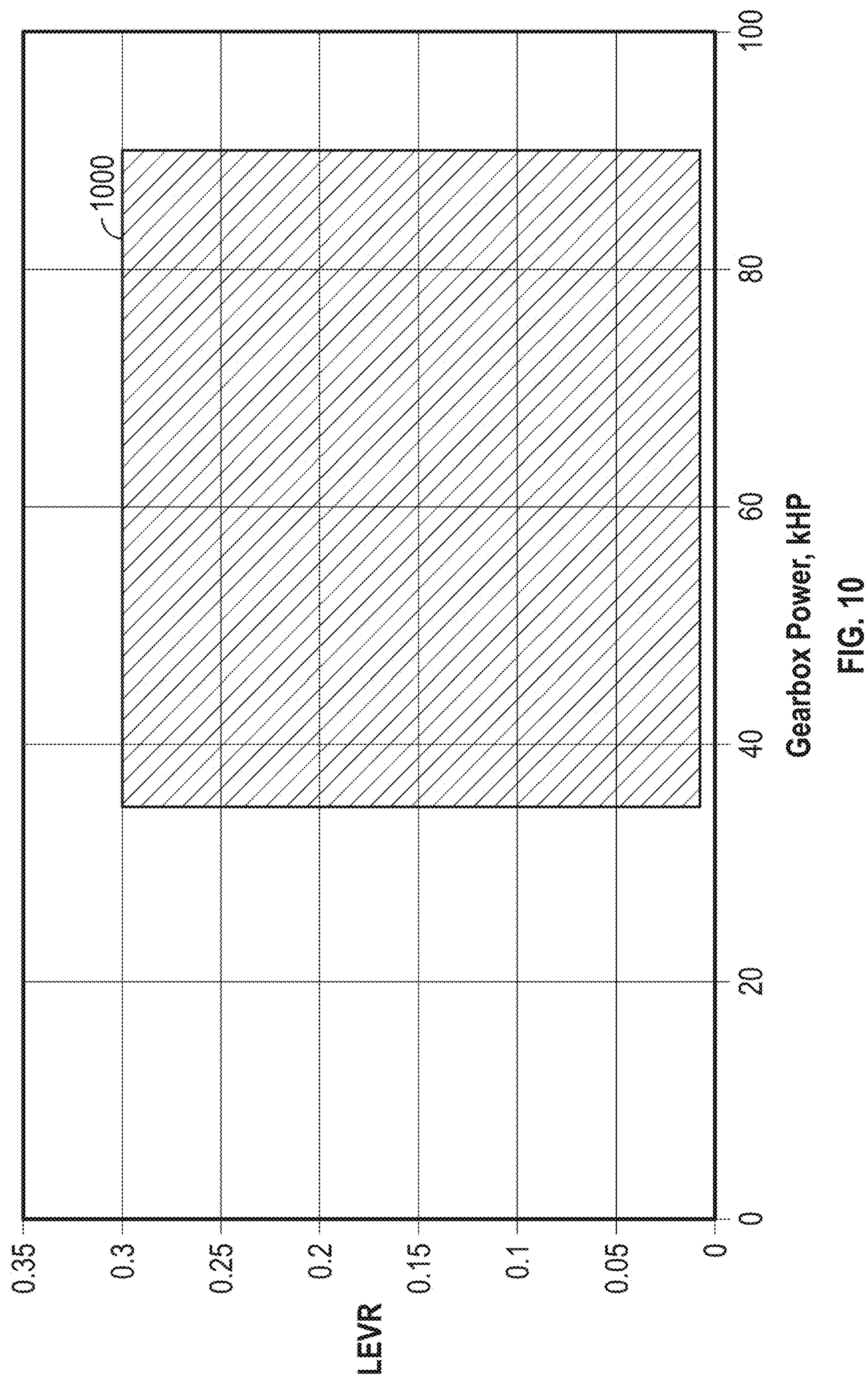
FIG. 10 illustrates a graph showing the lubricant extraction volume ratio as a function of gearbox power, according to an embodiment of the present disclosure.
Figure 11:
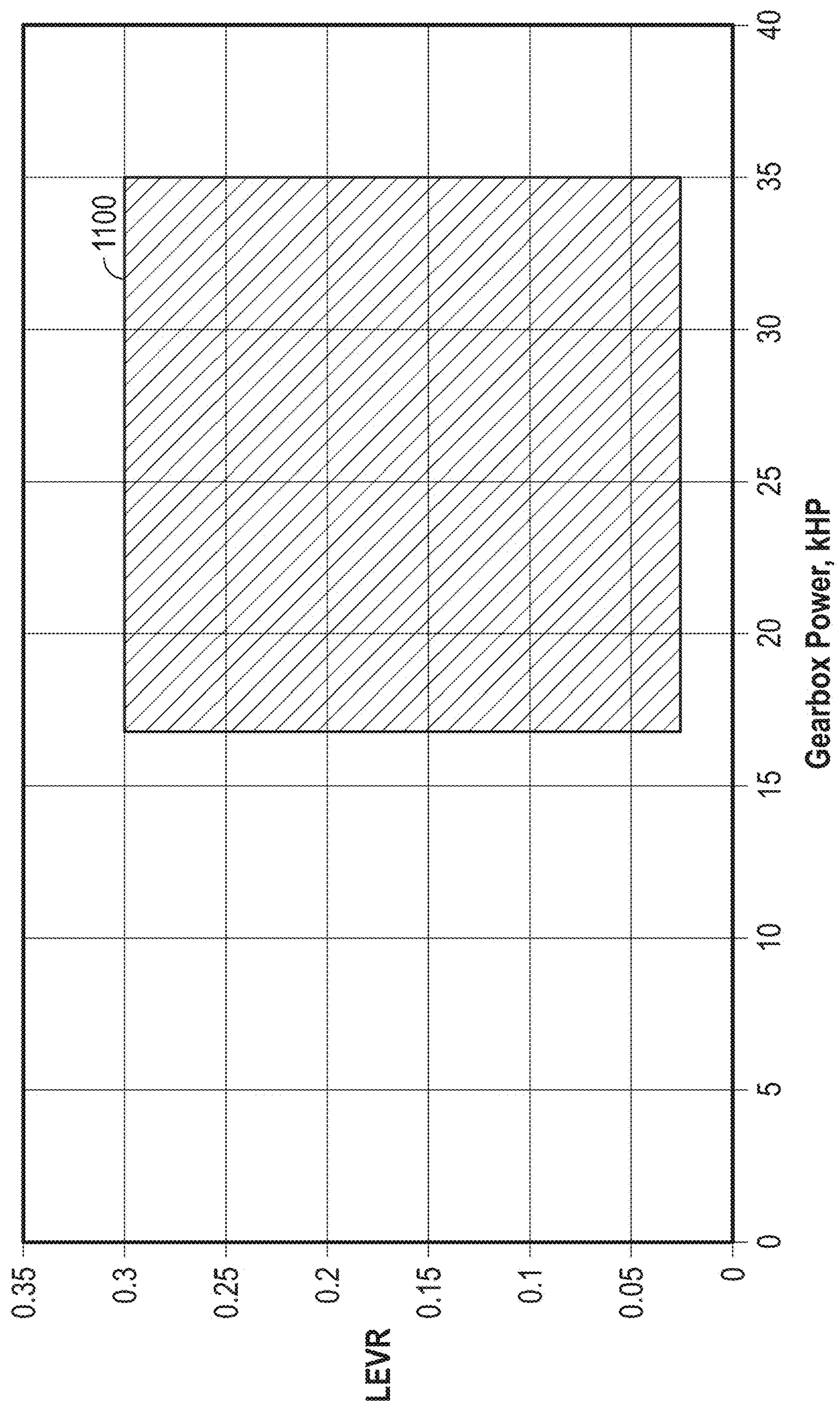
FIG. 11 illustrates a graph showing the lubricant extraction volume ratio as a function of gearbox power, according to an embodiment of the present disclosure.

In some embodiments, and as shown in a region 1000 in FIG. 10, LEVR is between 0.01 and 0.3, inclusive of the endpoints, for maximum gearbox power of between thirty-five kHP and ninety kHP, inclusive of the endpoints. In some embodiments, and as shown in a region 1100 in FIG. 11, LEVR is between 0.03 and 0.3, inclusive of the endpoints, for a maximum gearbox power of less than or equal to thirty-five kHP.

If the gutter volume relative to the gearbox volume is such that the LEVR upper limit is exceeded (e.g., a "large gutter"), there is too large of a volume within the gutter than is needed to recover gearbox lubricant scavenge, which can lead to increased lubricant churning loss and lubricant foaming in the gutter, leading to increased power loss in the overall gearbox assembly. The foaming in the gutter can generate drag in the gutter and negatively impact gearbox performance, and ultimately, engine performance. Furthermore, a large gutter requires more radial space and the increased material, mass, and size, etc., of the large gutter encroaches upon other system components within the engine (e.g., the core flow path), which, again, negatively impacts gearbox performance. The LEVR is selected to balance recovery of gearbox lubricant scavenge and impact to the engine operation and efficiency.

If the gutter volume relative to the gearbox volume is such that the LEVR lower limit is violated (e.g., a "small gutter"), there is too small of a volume within the gutter than is needed to recover the gearbox lubricant scavenge. The gutter will not fully capture the gearbox lubricant scavenge (e.g., flow $F_2$), leading to inadequate removal of the lubricant from the gearbox sump. This can lead to leakage of the scavenge lubricant back into the gearbox and/or to other areas of the engine, negatively impacting the performance of both the gearbox and the engine. The lower limit of the LEVR is selected to balance recovery of gearbox lubricant scavenge and impact to the gearbox and engine operation and efficiency (e.g., volume & weight penalty).

Taking into consideration the above considerations for selecting upper and lower limits, the LEVR may also be defined in terms of a Power Factor, Flow Transition Time and a Heat Density Parameter:

$$LEVR = PF * \frac{FT}{HDP} \quad (3)$$

where PF represents the Power Factor, FT represents the Flow Transition Time, and HDP represents the Heat Density parameter. The Power Factor PF is defined in (4):

$$PF=PD*(1-\eta) \quad (4)$$

where PD represents the gearbox power density and $\eta$ represents the gearbox efficiency. The power density PD is a ratio of the power of the gearbox to the volume of the gearbox and is between fifteen thousand hp/ft$^3$ and forty-five thousand hp/ft$^3$, inclusive of the endpoints. The gearbox efficiency is between 99.2 percent and 99.8 percent, inclusive of the endpoints.

The Flow Transition Time FT is given by:

$$FT = \frac{V_G}{V_{dot}} \quad (5)$$

where $V_G$ represents the gutter volume, as identified with respect to FIGS. 2 and 3. $V_{dot}$ represents the lubricant volumetric flow rate. The lubricant volumetric flow rate is defined by the gearbox power and the efficiency. Since the inefficiency of the gearbox generates heat, a certain quantity of lubricant is required to remove the heat. The Flow Transition Time is the time it takes the lubricant to traverse the entire gutter volume. The Flow Transition Time indirectly links the gutter volume to the gearbox volume. The Flow Transition Time is between 1.5 and eleven seconds, inclusive of the endpoints.

The Heat Density parameter HDP is defined as:

$$HDP=\rho*C*\Delta T \quad (6)$$

where $\rho$ represents the fluid density, C represents the lubricant specific heat, and $\Delta T$ represents the temperature rise in the lubricant, which, is between twenty degrees Celsius and forty-five degrees Celsius, inclusive of the endpoints.

Table 1 describes exemplary embodiments 1 and 2 identifying the LEVR for various engines. The embodiments 1 and 2 are for narrow body, turbofan engines. The LEVR of the present disclosure is not limited to such engines, however, and may be applicable over a wide range of thrust class and engine designs, including, for example, wide body engines. In some examples, the engine may include, but is not limited to, business jet propulsion engines, small turbofan engines, open rotor engines, marine and industrial turbine engines, including portable power generation units, and marine propulsion for ships.

TABLE 1

| Embodiments | Power (kHP) | $V_G$ (in^3) | $V_{GB}$ (in^3) | LEVR |
|---|---|---|---|---|
| 1 | 20-30 | 253 | 5601 | .045 |
| 2 | 17 | 37 | 691 | .054 |

As the gearbox power, and, thus, the gearbox size/volume increases, the gutter volume also must increase to ensure proper function of the gutter. However, the relationship between LEVR and gearbox (fan) power is not linear. Furthermore, different gearbox configurations like planetary and differential could require more lubricant flow due to the lower efficiency compared to a star gearbox configuration. Therefore, these higher power gearboxes with different operating configurations could yield LEVR nearing 0.3. Accordingly, for star gearbox configurations, Table 1 shows this relationship.

Accordingly, the gutter volume is critical to minimizing the lubricant scavenge losses as the lubricant exits the gearbox and is redirected to the scavenge port of the gutter.

Therefore, the present disclosure defines a lubricant extraction volume ratio that improves or maintains gearbox efficiency, while ensuring the gutter provided with the gearbox is not oversized or undersized with respect to the needs of the gearbox. By maintaining the gutter within the range defined by the lubricant extraction volume ratio, scavenge flow collection is maximized and the negative effects of the gutter (e.g., added weight and size to the system) that may contribute to a reduction in gearbox efficiency are minimized.

Further aspects of the present disclosure are provided by the subject matter of the following clauses.

According to an aspect of the present disclosure, a gearbox assembly comprises a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gearbox assembly of the preceding clause, wherein the lubricant extraction volume ratio is between 0.03 and 0.3, inclusive of the endpoints, for a gearbox power less than or equal to thirty-five kHP.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gutter volume is defined by an inner surface of a gutter wall of the gutter.

The gearbox assembly of any preceding clause, wherein the gearbox volume is defined by an outer diameter of the gearbox and a gearbox length of the gearbox.

The gearbox assembly of any preceding clause, wherein the outer diameter of the gearbox is an outer diameter of a ring gear.

The gearbox assembly of any preceding clause, wherein the gearbox length is defined between a forwardmost end of a gear of the gearbox and an aftmost end of the gear.

The gearbox assembly of any preceding clause, wherein the gearbox includes a sun gear, a plurality of planet gears, and a ring gear.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gearbox volume is defined by an outer diameter of the ring gear and a length of the gearbox.

The gearbox assembly of any preceding clause, wherein the lubricant extraction volume ratio is defined by a power factor, a flow transition time, and a heat density parameter.

The gearbox assembly of any preceding clause, wherein the flow transition time is defined by a gutter volume of the gutter and a lubricant volumetric flow rate of a lubricant through the gearbox.

The gearbox assembly of any preceding clause, wherein the flow transition time is between 1.5 seconds and eleven seconds, inclusive of the endpoints.

The gearbox assembly of any preceding clause, wherein the power factor is defined by a power density of the gearbox and an efficiency of the gearbox.

The gearbox assembly of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gearbox assembly of any preceding clause, wherein the gearbox includes a sun gear, a plurality of planet gears, and a ring gear, and wherein the gutter circumscribes the ring gear.

The gearbox assembly of any preceding clause, wherein the gutter wholly circumscribes the ring gear.

The gearbox assembly of any preceding clause, wherein the gutter partially circumscribes the ring gear.

The gearbox assembly of any preceding clause, wherein the gutter is located radially outward of the gearbox.

The gearbox assembly of any preceding clause, wherein the gutter further comprises a scavenge port located near a bottom of the gutter.

The gearbox assembly of any preceding clause, wherein the gearbox is a star configuration.

The gearbox assembly of any preceding clause, wherein the gearbox is a planetary configuration.

The gearbox assembly of any preceding clause, wherein the gearbox is a differential gearbox.

The gearbox assembly of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gearbox assembly of any preceding clause, wherein the gutter volume is between 0.01 and 0.3 times, inclusive of the endpoints, the gearbox volume.

According to an aspect of the present disclosure, a gas turbine engine comprises a gearbox assembly comprising a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gas turbine engine of the preceding clause, wherein the lubricant extraction volume ratio is between 0.01 and 0.3, inclusive of the endpoints, when the gas turbine engine has an engine power greater than or equal to thirty-five kHP.

The gas turbine engine of any preceding clause, wherein the engine power is between thirty-five kHP and ninety kHP, inclusive of the endpoints.

The gas turbine engine of any preceding clause, wherein the lubricant extraction volume ratio is between 0.03 and 0.3, inclusive of the endpoints.

The gas turbine engine of any preceding clause, wherein the lubricant extraction volume ratio is between 0.03 and 0.3, inclusive of the endpoints, when the gas turbine engine has an engine power less than or equal to thirty-five kHP.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gutter volume is defined by an inner surface of a gutter wall of the gutter.

The gas turbine engine of any preceding clause, wherein the gearbox volume is defined by an outer diameter of the gearbox and a gearbox length of the gearbox.

The gas turbine engine of any preceding clause, wherein the outer diameter of the gearbox is an outer diameter of a ring gear.

The gas turbine engine of any preceding clause, wherein the gearbox length is defined between a forwardmost end of a gear of the gearbox and an aftmost end of the gear.

The gas turbine engine of any preceding clause, wherein the gearbox includes a sun gear, a plurality of planet gears, and a ring gear.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gearbox volume is defined by an outer diameter of the ring gear and a length of the gearbox.

The gas turbine engine of any preceding clause, wherein the lubricant extraction volume ratio is defined by a power factor, a flow transition time, and a heat density parameter.

The gas turbine engine of any preceding clause, wherein the power factor is defined by a power density of the gearbox and an efficiency of the gearbox.

The gas turbine engine of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gas turbine engine of any preceding clause, wherein the flow transition time is defined by a gutter volume of the gutter and a lubricant volumetric flow rate of a lubricant through the gearbox.

The gas turbine engine of any preceding clause, wherein the flow transition time is between 1.5 seconds and eleven seconds, inclusive of the endpoints.

The gas turbine engine of any preceding clause, wherein the gearbox includes a sun gear, a plurality of planet gears, and a ring gear, and wherein the gutter circumscribes the ring gear.

The gas turbine engine of any preceding clause, wherein the gutter wholly circumscribes the ring gear.

The gas turbine engine of any preceding clause, wherein the gutter partially circumscribes the ring gear.

The gas turbine engine of any preceding clause, wherein the gutter is located radially outward of the gearbox.

The gas turbine engine of any preceding clause, wherein the gutter further comprises a scavenge port located near a bottom of the gutter.

The gas turbine engine of any preceding clause, wherein the gearbox is a star configuration.

The gas turbine engine of any preceding clause, wherein the gearbox is a planetary configuration.

The gas turbine engine of any preceding clause, wherein the gearbox is a differential gearbox.

The gas turbine engine of any preceding clause, wherein the gearbox volume is between eight hundred $in^3$ and two thousand $in^3$, inclusive of the endpoints, when the engine power is between eighteen kHP and thirty-five kHP, inclusive of the endpoints.

The gas turbine engine of any preceding clause, wherein the gutter volume is between 0.01 and 0.3 times, inclusive of the endpoints, the gearbox volume.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:

a gearbox assembly comprising:

a gearbox including a gear assembly and having a gearbox volume defined by an outer diameter of the gearbox and a gearbox length of the gearbox; and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume; and a lubrication system comprising:

a sump in fluid communication with the gearbox assembly, the sump being a primary reservoir having a first lubricant level; and a secondary reservoir in the gearbox assembly, the secondary reservoir having a second lubricant level that is greater than the first lubricant level, wherein the lubrication system fills the secondary reservoir with a lubricant between the first lubricant level and the second lubricant level, and the gear assembly collects the lubricant in the secondary reservoir to supply the lubricant from the secondary reservoir to the gear assembly.

2. The gas turbine engine of claim 1, wherein the first lubricant level of the sump is below the gear assembly such that the gear assembly is prevented from contacting the lubricant in the sump during operation of the gas turbine engine, and the second lubricant level is positioned such that at least a portion of the gear assembly contacts the lubricant in the secondary reservoir.

3. The gas turbine engine of claim 1, wherein the gear assembly includes one or more scuppers that scoop the lubricant within the secondary reservoir onto the gear assembly as the gear assembly rotates.

4. The gas turbine engine of claim 1, further comprising a tank that stores the lubricant therein, a lubricant pump, and a lubricant supply line in fluid communication with the tank and the gearbox assembly, the lubricant pump pumping the lubricant from the tank to the gearbox assembly through the lubricant supply line during operation of the gas turbine engine.

5. The gas turbine engine of claim 4, wherein the sump includes a sump line in fluid communication with the sump and the tank, and the lubricant drains from the sump to the tank through the sump line.

6. The gas turbine engine of claim 5, further comprising a drain valve within the sump line, the drain valve opening to allow the lubricant to drain through the sump line and closing to prevent the lubricant from draining through the sump line.

7. The gas turbine engine of claim 6, wherein the drain valve opens or closes based on at least one of a pressure of the lubricant in the lubrication system, a pressure of fuel in the gas turbine engine, or a pressure of hydraulics in the gas turbine engine.

8. The gas turbine engine of claim 1, wherein the lubrication system includes a first drain port in fluid communication with the sump, the lubricant draining from the sump through the first drain port.

9. The gas turbine engine of claim 8, wherein the first drain port is positioned at approximately a six o'clock position of the gearbox assembly.

10. The gas turbine engine of claim 8, wherein the lubrication system includes a second drain port in fluid communication with the secondary reservoir, the lubricant draining from the secondary reservoir through the second drain port.

11. The gas turbine engine of claim 10, wherein the second drain port is positioned at approximately the second lubricant level such that the lubricant drains through the second drain port at the second lubricant level.

12. The gas turbine engine of claim 10, further comprising a third drain port positioned on a first circumferential side of the first drain port, and a fourth drain port positioned on a second circumferential side of the first drain port, wherein the lubricant drains through the third drain port or the fourth drain port when the gearbox assembly rotates clockwise or counterclockwise.

13. The gas turbine engine of claim 12, wherein the fourth drain port is positioned between the first drain port and the second drain port.

14. A gas turbine engine comprising:

a gearbox assembly comprising:

a gearbox including a gear assembly and having a gearbox volume defined by an outer diameter of the gearbox and a gearbox length of the gearbox; and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume; and a lubrication system comprising:

a sump in fluid communication with the gearbox assembly, the sump being a primary reservoir having a first lubricant level of a lubricant that is below the gear assembly such that the gear assembly is prevented from contacting the lubricant in the sump during operation of the gas turbine engine;

a secondary reservoir in the gearbox assembly, the secondary reservoir having a second lubricant level that is greater than the first lubricant level and is positioned such that at least a portion of the gear assembly contacts the lubricant in the secondary reservoir;

a first drain port in fluid communication with the sump, the lubricant draining from the sump through the first drain port; and a second drain port in fluid communication with the secondary reservoir, wherein the lubrication system fills the secondary reservoir with the lubricant between the first lubricant level and the second lubricant level and a portion of the lubricant drains through the second drain port, and the gear assembly collects the lubricant in the secondary reservoir to supply the lubricant from the secondary reservoir to the gear assembly.

15. The gas turbine engine of claim 14, wherein the gear assembly includes one or more scuppers that scoop the lubricant within the secondary reservoir onto the gear assembly as the gear assembly rotates.

16. The gas turbine engine of claim 14, wherein the second drain port is positioned at approximately the second lubricant level such that the lubricant drains through the second drain port at the second lubricant level.

17. The gas turbine engine of claim 14, further comprising a third drain port positioned on a first circumferential side of the first drain port, and a fourth drain port positioned on a second circumferential side of the first drain port, wherein the lubricant drains through the third drain port or the fourth drain port when the gearbox assembly rotates clockwise or counterclockwise.

18. The gas turbine engine of claim 14, further comprising a tank that stores the lubricant therein, a lubricant pump, and a lubricant supply line in fluid communication with the tank and the gearbox assembly, the lubricant pump pumping the lubricant from the tank to the gearbox assembly through the lubricant supply line during operation of the gas turbine engine.

19. The gas turbine engine of claim 18, wherein the sump includes a sump line in fluid communication with the sump and the tank, and the lubricant drains from the sump to the tank through the sump line.

20. The gas turbine engine of claim 19, further comprising a drain valve within the sump line, the drain valve opening to allow the lubricant to drain through the sump line and closing to prevent the lubricant from draining through the sump line.

* * * * *